(12) United States Patent
Tsai et al.

(10) Patent No.: US 11,686,885 B2
(45) Date of Patent: Jun. 27, 2023

(54) METALENS FOR LIGHT FIELD IMAGING

(71) Applicant: ACADEMIA SINICA, Taipei (TW)

(72) Inventors: Din-Ping Tsai, Taipei (TW); Cheng-Hung Chu, New Taipei (TW); Ren-Jie Lin, Hsinchu (TW); Mu-Ku Chen, New Taipei (TW); Pin-Chieh Wu, Tainan (TW)

(73) Assignee: ACADEMIA SINICA, Taipei (TW)

( * ) Notice: Subject to any disclaimer, the term of this patent is extended or adjusted under 35 U.S.C. 154(b) by 610 days.

(21) Appl. No.: 16/721,343

(22) Filed: Dec. 19, 2019

(65) Prior Publication Data

US 2020/0225386 A1    Jul. 16, 2020

Related U.S. Application Data

(60) Provisional application No. 62/782,652, filed on Dec. 20, 2018.

(51) Int. Cl.
*G02B 3/00* (2006.01)
*G02B 1/00* (2006.01)
*H04N 23/55* (2023.01)

(52) U.S. Cl.
CPC ........... *G02B 3/0068* (2013.01); *G02B 1/002* (2013.01); *G02B 3/0087* (2013.01); *H04N 23/55* (2023.01)

(58) Field of Classification Search
CPC .... G02B 3/0068; G02B 1/002; G02B 3/0087; H04N 5/2254
USPC ........................................................ 359/362
See application file for complete search history.

(56) References Cited

U.S. PATENT DOCUMENTS

2015/0180133 A1    6/2015  Hunt et al.
2018/0156949 A1    6/2018  Tsai et al.

FOREIGN PATENT DOCUMENTS

TW         201821353 A     6/2018

OTHER PUBLICATIONS

Keum et al., "Planar Emulation of Natural Compound Eyes," Small 8, 2169-2173 (2012), 5 pages.
Song et al., "Digital cameras with designs inspired by the arthropod eye" Nature 497, 95-99 (2013), 5 pages.
(Continued)

*Primary Examiner* — Collin X Beatty
*Assistant Examiner* — Grant A Gagnon
(74) *Attorney, Agent, or Firm* — Muncy, Geissler, Olds & Lowe, P.C.

(57) ABSTRACT

Compound eyes of insects are great optical system for imaging and sensing by the nature creator, which is an unsurpassed challenge due to its precision and small size. Here, we use meta-lens consisting of GaN nano-antenna to open the fascinating doorway to full-color achromatic light field imaging and sensing. A 60×60 multi-channels metalens array is used for effectively capturing multi-dimensional optical information including image and depth. Based on this, the multi-dimensional light field imaging and sensing of a moving object is capable to be experimentally implemented. Our system presents a diffraction-limit resolution of 1.95 micrometer via observing the standard resolution test chart under white light illumination. This is the first mimic optical light field imaging and sensing system of insect compound eye, which has potential applications in micro robotic vision, non-men vehicle sensing, virtual and augmented reality, etc.

19 Claims, 22 Drawing Sheets
(14 of 22 Drawing Sheet(s) Filed in Color)

(56) References Cited

OTHER PUBLICATIONS

Lumsdaine et al., "Full resolution lightfield rendering," Indiana University and Adobe Systems, Tech. Rep 91, 92 (2008), 12 pages.
Adelson et al., "Single Lens Stereo With a Plenoptic Camera," IEEE Transactions on Pattern Analysis and Machine Intelligence 14, 99-106 (1992), 8 pages.
Georgiev et al., "Focused plenoptic camera and rendering," Journal of Electronic Imaging 19, 021106 (2010), 11 pages.
Levoy et al., The Light Field Microscope, Acm Transactions on Graphics 25, 924-934 (2006), 1 page.
Ng et al., "Light Field Photography with a Hand-held Plenoptic Camera," Computer Science Technical Report CSTR 2, 1-11 (2005), 11 pages.
Wilburn et al., "High Performance Imaging Using Large Camera Arrays," Acm Transactions on Graphics 24, 765-776 (2005), 12 pages.
Georgiev et al., "Reducing Plenoptic Camera Artifacts," Computer Graphics Forum 29, 1955-1968 (2010), 14 pages.
Zeller et al., "Depth estimation and camera calibration of a focused plenoptic camera for visual odometry," ISPRS Journal of Photogrammetry and Remote Sensing 118, 83-100 (2016), 18 pages.
Arslan et al., "Angle-selective all-dielectric Huygens' metasurfaces," J. Phys. D-Appl. Phys. 50, 8 (2017), 9 pages.
Chen et al., "Uniaxial-isotropic Metamaterials by Three-Dimensional Split-Ring Resonators," Advanced Optical Materials 3, 44-48 (2015), 5 pages.
Huang et al., "Gate-Tunable Conducting Oxide Metasurfaces," Nano Letters 16, 5319-5325 (2016), 7 pages.
Jahani et al., "All-dielectric metamaterials," Nature Nanotechnology 11, 23-36 (2016), 14 pages.
Kapitanova et al., "Photonic spin Hall effect in hyperbolic metamaterials for polarization-controlled routing of subwavelength modes," Nature Communications 5, 3226 (2014), 8 pages.
Krishnamoorthy et al., "Topological transitions in metamaterials" Science 336, 205-209 (2012), 6 pages.
Mudachathi et al., "Up Scalable Full Colour Plasmonic Pixels with Controllable Hue, Brightness and Saturation," Scientific Reports 7, 1199 (2017), 10 pages.
Ni et al., "An ultrathin invisibility skin cloak for visible light," Science 349, 1310-1314 (2015), 6 pages.
Nicholls et al., "Ultrafast synthesis and switching of light polarization in nonlinear anisotropic metamaterials," Nature Photonics 11, 628-633 (2017), 6 pages.
Peter Nordlander, "Plasmonics—Subwavelength imaging in colour," Nature Photonics 2, 387-388 (2008), 2 pages.
Rho et al., "Spherical hyperlens for two-dimensional sub-diffractional imaging at visible frequencies," Nature Communications 1, 143 (2010), 5 pages.
Sherrott et al., "Experimental Demonstration of >230° Phase Modulation in Gate-Tunable Graphene-Gold Reconfigurable Mid-Infrared Metasurfaces," Nano Letters 17, 3027-3034 (2017), 8 pages.
Thyagarajan et al., "Millivolt Modulation of Plasmonic Metasurface Optical Response via Ionic Conductance," Advanced Materials 29, 17011044 (2017), 8 pages.
Wang et al., "Grayscale transparent metasurface holograms," Optica 3, 1504-1505 (2016), 2 pages.
Davoyan et al., "Quantum nonlinear light emission in metamaterials: broadband Purcell enhancement of parametric downconversion," Optica 5, 608-611 (2018), 4 pages.
Della Valle et al., "Nonlinear Anisotropic Dielectric Metasurfaces for Ultrafast Nanophotonics," ACS Photonics 4, 2129-2136 (2017), 8 pages.
Dickson et al., "Hyperbolic Poiaritonic Crystals Based on Nanostructured Nanorod Metamaterials," Advanced Materials 27, 5974-5980 (2015), 7 pages.
Dyachenko et al., "Controlling thermal emission with refractory epsilon-near-zero metamaterials via topological transitions," Nature Communications 7, 11809 (2016), 8 pages.
Halas et al., "Plasmons in Strongly Coupled Metallic Nanostructures," Chemical Reviews 111, 3913-3961 (2011), 49 pages.
Hao et al., "Symmetry Breaking in Plasmonic Nanocavities: Subradiant LSPR Sensing and a Funable Fano Resonance," Nano Letters 8, No. 11, 3983-3988 (2008), 6 pages.
Hu et al., "Plasmonic Lattice Lenses for Multiwavelength Achromatic Focusing," ACS Nano 10, 10275-10282 (2016), 8 pages.
Huang et al., "Nanoscale Artificial Plasmonic Lattice in Self-Assembled Vertically Aligned Nitride-Metal Hybrid Metamaterials," Advanced Science 5, 1800416 (2018), 9 pages.
Ishikawa et al., "Plasmon hybridization in graphene metamaterials," Applied Physics Letters 102, 253110 (2013), 5 pages.
Jahani et al., "Controlling evanescent waves using silicon photonic all-dielectric metamaterials for dense integration," Nature Communications 9, 1893 (2018), 9 pages.
Kuznetsov et al., "Optically resonant dielectric nanostructures," Science 354, Iss. 6314(2016), 10 pages.
Lassiter et al., "Designing and Deconstructing the Fano Lineshape in Plasmonic Nanoclusters," Nano Letters 12, 1058-1062 (2012), 5 pages.
Lu et al., "Dynamically controlled Purcell enhancement of visible spontaneous emission in a gated plasmonic heterostructure," Nature Communications 8, 1631 (2017), 8 pages.
Marino et al., "Second-Harmonic Generation from Hyperbolic Plasmonic Nanorod Metamaterial Slab," Laser & Photonics Reviews 12, 1700189 (2018), 9 pages.
Moritake et al., "Controlling bi-anisotropy in infrared metamaterials using three-dimensional split-ring-resonators for purely magnetic resonance," Scientific Reports 7, 6726 (2017), 6 pages.
Moritake et al., "Bi-anisotropic Fano resonance in three-dimensional metamaterials," Scientific Reports 8, 9012 (2018), 8 pages.
Ni et al., "An ultrathin invisibility skin cloak for visible light," Science 349, Iss. 6254, 1310-1314 (2015), 6 pages.
Teri W. Odom, "Colours at the Nanoscale: Printable stained glass," Nature Nanotechnology 7, 550 (2012), 2 pages.
Papadakis et al., "Field-effect induced tunability in hyperbolic metamaterials," Physical Review B 92, 184101 (2015), 11 pages.
Papadakis et al., "Optical magnetism in planar metamaterial heterostructures," Nature Communications 9, 296 (2018), 9 pages.
Papadakis et al., "Retrieval of material parameters for uniaxial metamaterials," Physical Review B 91, 155406 (2015), 12 pages.
Pryce et al., "Highly Strained Compliant Optical Metamaterials with Large Frequency Tunability," Nano Letters 10, 4222-4227 (2010), 6 pages.
Sartorello et al., "Ultrafast Optical Modulation of Second-and Third-Harmonic Generation from Cut-Disk-Based Metasurfaces," ACS Photonics 3, 1517-1522 (2016), 6 pages.
Sobhani et al., "Pronounced Linewidth Narrowing of an Aluminum Nanoparticle Plasmon Resonance by Interaction with an Aluminum Metallic Film," Nano Letters 15, 6946-6951 (2015), 6 pages.
Suchowskii et al., "Phase Mismatch-Free Nonlinear Propagation in Optical Zero-Index Materials," Science 342, 1223-1226 (2013), 5 pages.
Wells et al., "Nonlocal optics of plasmonic nanowire metamaterials," Physical Review B 89, 035111 (2014), 10 pages.
Yang et al., "Multimode directionality in all-dielectric metasurfaces," Physical Review B 95, 165426 (2017), 10 pages.
Yao et al., "Optical Negative Refraction in Bulk Metamaterials of Nanowires," Science 321, 930-930 (2008), 2 pages.
Yin et al., "Photonic Spin Hall Effect at Metasurfaces," Science 339, 1405-1407 (2013), 3 pages.
Xiang Zhang, "Metamaterials for perpetual cooling at large scales," Science 355, Iss. 6329, 1023-1024 (2017), 3 pages.
Zhou et al., "Lasing action in strongly coupled plasmonic nanocavity arrays," Nature Nanotechnology 8, 506-511 (2013), 6 pages.
Wang et al., "Ultrathin Planar Cavity Metasurfaces," Small 14, 1703920 (2018), 6 pages.
Chen et al., "GaN Metalens for Pixel-Level Full-Color Routing at Visible Light," Nano Letters 17, 6345-6352 (2017), 8 pages.
Hsiao et al., "Integrated Resonant Unit of Metasurfaces for Broadband Efficiency and Phase Manipulation," Advanced Optical Materials, 1800031 (2018), 10 pages.

(56) References Cited

OTHER PUBLICATIONS

Wang et al., "A broadband achromatic metalens in the visible," Nature Nanotechnology 13, 227-232 (2018), 6 pages.
Wang et al., "Broadband achromatic optical metasurface devices," Nature Communications 8, 187 (2017), 9 pages.
Goldys et al., "Analysis of the red optical emission in cubic GaN grown by molecular-beam epitaxy," Physical Review B 60, No. 8, 5464-5469 (1999), 6 pages.
Barker et al., "Infrared Lattice Vibrations and Free-Electron Dispersion in GaN," Physical Review B 7, No. 2, 743-750 (1973), 8 pages.
Georgiev et al., "Reducing Plenoptic Camera Artifacts," Computer Graphics Forum 29, No. 6, 1955-1968 (2010), 14 pages.
Lin et al., "Achromatic metalens array for full-colour light-field imaging," Nature Nanotechnology 14, 227-231 (2019), 6 pages.

METALENS FOR LIGHT FIELD IMAGING

CROSS REFERENCE TO RELATED APPLICATIONS

The non-provisional patent application claims priority to U.S. provisional patent application with Ser. No. 62/782,652 filed on Dec. 20, 2018. This and all other extrinsic materials discussed herein are incorporated by reference in their entirety.

BACKGROUND

Technical Field

This invention herein relates to the light field camera, light field microscope, compound eye system of micro robot, distance measurement system of unmanned vehicle, virtual reality, augmented reality, high dimension photon entanglement

Related Arts

Vision is the most important perception system of the majority of living things for detecting the information of surrounding environment via the reflected light from objects. Compared with the human eyes, the vision systems of insects comprise of an array of tiny eyes, so-called compound eyes, exhibiting the advantages of large field-of-view and high spatial sensing capability including distance estimation and polarization identification. These unique features have attracted tremendous interests and been used to develop many imaging systems, including the compound eyes cameras (1, 2) and light field cameras (3-8). The light field consists of the position and direction information of light rays distributing in the target scene. Compared with the conventional optical imaging, light field imaging can provide not only the two-dimensional intensity but also enables the scene reconstructing with refocusing images and depth information (3, 9, 10). Microlens array was used to implement this purpose for light field camera, however, it is quite difficult to have broadband achromatic and low defect microlens array without spherical aberration. Another inherent disadvantage is that the diameter of single microlens is still too large to have feasible depth of field close to the compound eyes of insects designed by the nature creator.

Recently, one of the most attractive applications of metamaterials (11-55) is the meta-lens. Meta-lenses have successfully demonstrated excellent optical properties for the focusing and manipulation of incident light beam with very compact size (56-60). Achromatic meta-lens using integrated-resonant unit exhibits excellent aberrations free imaging capability recently (59, 60). The white light image with spatial resolution of 2.2 micrometer and full-color imaging have also been reported by a 50 micrometer diameter GaN achromatic meta-lens (59). The inherent advantages of the achromatic meta-lens are free of spherical aberration, long depth of field (DOF), light weight and compact size. In this paper, we implement a light field imaging with a compact and flat GaN achromatic meta-lens array (AMLA) to capture multi-dimensional light field information. The 60×60 array of GaN achromatic meta-lens with diameter of single achromatic meta-lens being 21.65 micrometer is used in our experiment. The spatial scene can be reconstructed by a series of rendered images with different focusing depths slice-by-slice. The depths of every objects in scene are determined, which enable the further demonstrate the feasibility of velocity measurement.

SUMMARY

A light field imaging system with an ultra-compact and flat achromatic metalens array without spherical aberration to acquire four-dimensional light field information is proposed. The structural design is based on the two-dimensional metasurfaces composed of dielectric integrated resonance nano-antenna. Using this platform and rendering algorithm, we can get the reconstructed scene by a series of images with arbitrary focusing depths slice-by-slice and the depth information of objects.

Microlens arrays are commonly used in vision technologies such as light field camera, light field microscopy etc. The intrinsic optical properties of natural materials result in microlens arrays with chromatic aberration and spherical aberration. Compared with microlens array, the advantages of the metalens array provided by this disclosure, are achromatism, spherical aberration free, focal length and numerical aperture can be arbitrarily designed and can directly integrate with CMOS CCD by semiconductor fabrication process.

To achieve the above objective, one embodiment of the invention discloses a light field imaging device. The light field imaging device comprises a main lens, a metalens array and an imaging sensing unit. The metalens array is disposed in alignment with the main lens, wherein the metalens array comprises a plurality of metalenses and each metalens comprises a plurality of nanostructures and a dielectric layer. The nanostructures are disposed on the dielectric layer. The nanostructures comprises an array of first phase compensation structures and an array of second phase compensation structures. The array of the first phase compensation structures are disposed to surround the array of the second phase compensation structures so as to define a single metalens. The first and second phase compensation structures are complementary to each other and substantially satisfy the Babinet's principle. The imaging sensing unit is disposed on an opposite side of the metalens array with respect to the main lens, and is configured to receive an imaging signal generated from the metalens array.

In one embodiment, each first phase compensation structure is a nanopillar, each second phase compensation structure is a nanopore.

In one embodiment, each metalens has a phase profile which satisfy the following equations (A) to (D):

$$\varphi_{AL}(r, \lambda) = -\left[\frac{2\pi}{\lambda}\left(\sqrt{r^2 + f^2} - f\right)\right] + \varphi_{shift}(\lambda) \tag{A}$$

$$\varphi_{shift}(\lambda) = \frac{a}{\lambda} + b \tag{B}$$

$$a = \delta \frac{\lambda_{min}\lambda_{max}}{\lambda_{max} - \lambda_{min}} \tag{C}$$

$$b = -\delta \frac{\lambda_{min}}{\lambda_{max} - \lambda_{min}} \tag{D}$$

where $\varphi_{AL}$ is a phase retardation of an arbitrary point on a surface of the metalens, r is a distance between said arbitrary point and a center on said surface of the metalens, λ is a working wavelength in free space, f is a designed focal length, $\lambda_{min}$ and $\lambda_{max}$ are the boundaries of an interest wavelength band, and δ is a largest additional phase shift between $\lambda_{min}$ and $\lambda_{max}$ at the center of the metalens.

In one embodiment, each first phase compensation structure and each second phase compensation structure are made of a transparent material which is selected from the group consisting of gallium nitride (GaN), gallium phosphide (GaP), aluminum arsenide (AlAs), aluminum gallium arsenide (AlGaAs), titanium dioxide (TiO$_2$), silicon (Si), and silicon nitride (Si$_3$N$_4$).

In one embodiment, the first and second phase compensation structures are in a periodic hexagonal lattice.

In one embodiment, the dielectric layer is made of a material which is selected from the group consisting of ITO, Al:ZnO (AZO), Ga:ZnO(GZO), SiO$_2$ and Al$_2$O$_3$.

In one embodiment, each metalens is transparent.

In one embodiment, each first phase compensation structure is a nanopore, and each second phase compensation structure is a nanopillar.

In one embodiment, in at least one of the metalenses the first phase compensation structures are nanopillars and the second phase compensation structures are nanopores, and in at least another one of the metalenses the first phase compensation structures are nanopores and the second phase compensation structures are nanopillars.

In one embodiment, focal lengths of all metalenses are the same.

In one embodiment, at least one of the metalenses has a focal length which is different from that of another metalens.

In one embodiment, the array of the first phase compensation structures surrounds the array of the second phase compensation structures concentrically.

In one embodiment, the imaging signal comprises a plurality of sub-images, and each sub-image is generated from each single metalens.

To achieve the above objective, another embodiment of the invention discloses a light field imaging method. The light field imaging method comprises the following steps: (a) receiving an optical signal of an object by a metalens array from a main lens, wherein the metalens array comprises a plurality of metalenses, and each metalens comprises a plurality of nanostructures and a dielectric layer, wherein the nanostructures are disposed on the dielectric layer, and the nanostructures comprises an array of first phase compensation structures and an array of second phase compensation structures, wherein the array of the first phase compensation structures are disposed to surround the array of the second phase compensation structures so as to define a single metalens, the first and second phase compensation structures are complementary to each other and substantially satisfy the Babinet's principle; (b) obtaining an imaging signal generated from the metalens array by an imaging sensing unit, wherein the imaging signal comprises a plurality of sub-images of the object; and (c) rendering the imaging signal which comprises the sub-images based on a specific focal depth so as to obtain an image of the object at the specific focal depth.

In one embodiment, each sub-image is generated from each single metalens.

In one embodiment, during rendering the imaging signal, a square patch of each sub-image is adopted so as to integrate the image of the object at the specific focal depth, wherein each square patch is positioned at the center of each sub-image.

In one embodiment, sizes of the square patches are varied with the specific focal depth.

To achieve the above objective, another embodiment of the invention discloses an image depth estimation method.

The image depth estimation method comprises the following steps: (a) obtaining an imaging signal which comprises a plurality of sub-images of an object and is generated from a metalens array by an imaging sensing unit, wherein the metalens array comprises a plurality of metalenses, and each metalens comprises a plurality of nanostructures and a dielectric layer, wherein the nanostructures are disposed on the dielectric layer, and the nanostructures comprises an array of first phase compensation structures and an array of second phase compensation structures, wherein the array of the first phase compensation structures are disposed to surround the array of the second phase compensation structures so as to define a single metalens, the first and second phase compensation structures are complementary to each other and substantially satisfy the Babinet's principle; (b) selecting one of the sub-image; (c) deciding a square patch in the selected sub-image, wherein the square patch has a size around a quarter of a diameter of the metalens which generates the selected sub-image; (d) calculating radiance differences between the selected sub-image and an adjacent sub-image of the selected sub-image so as to obtain a disparity between the selected sub-image and the adjacent sub-image; and (e) calculating the obtained disparities to obtain a depth information of the imaging signal.

In one embodiment, each disparity between any two adjacent sub-images is calculated from a sum of the radiance differences of red, green, and blue light between said two adjacent sub-images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 Quantification of the imaging resolution of light field system with AMLA. (a), Raw light field image of 1951 USAF resolution test chart. (b), The rendered image of FIG. 6a.

FIG. 16: A real-time depth map of the scene of combination of earth, rocket and Saturn. The rocket is moving to Saturn. a, The rendered figure refocusing in rocket. b, Corresponding depth map of a.

DETAILED DESCRIPTION OF THE INVENTION

The embodiments of the invention will be apparent from the following detailed description, which proceeds with reference to the accompanying drawings, wherein the same references relate to the same elements. Specific structures and function details disclosed herein are only for the illustrative purpose for describing the exemplary embodiment of this disclosure.

Light Field Imaging with Meta-Lens Array

Figure 1A:
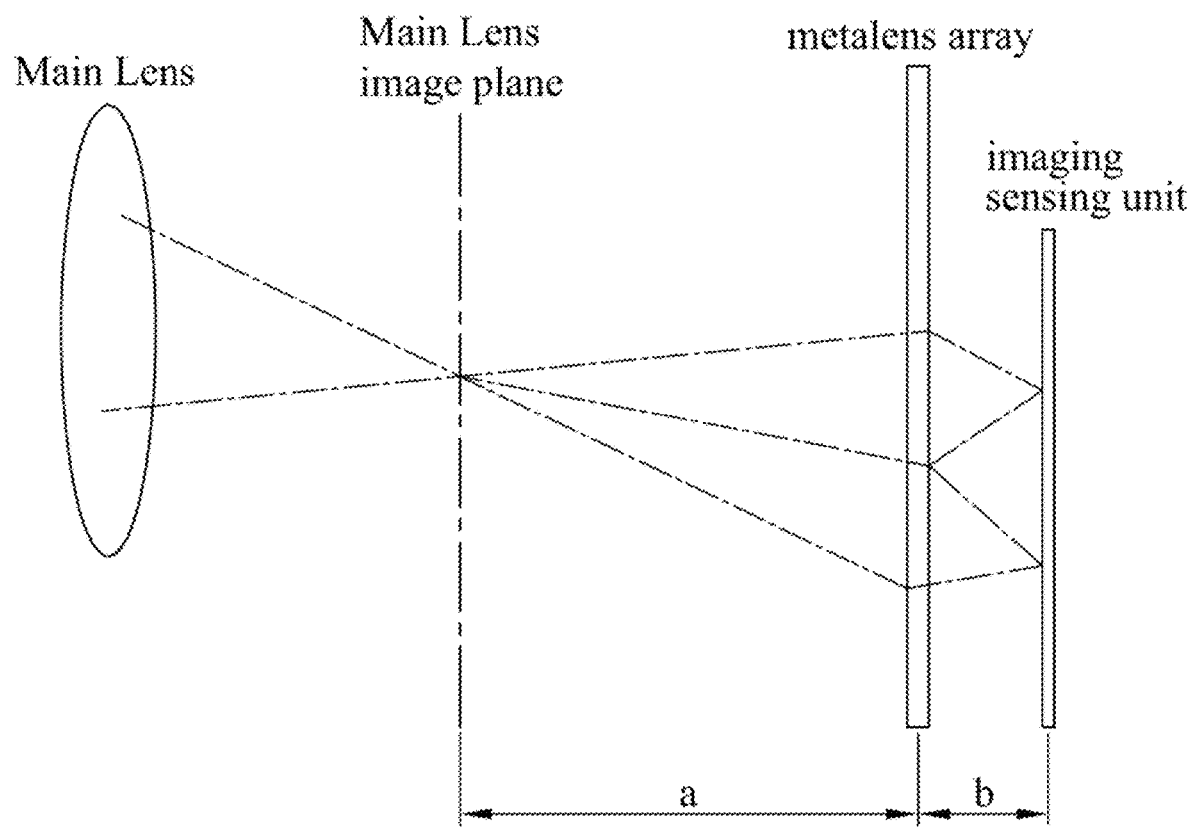
FIG. 1A is a schematic view of the light field imaging device (light field camera) according to one embodiment of this disclosure.
Figure 1B:
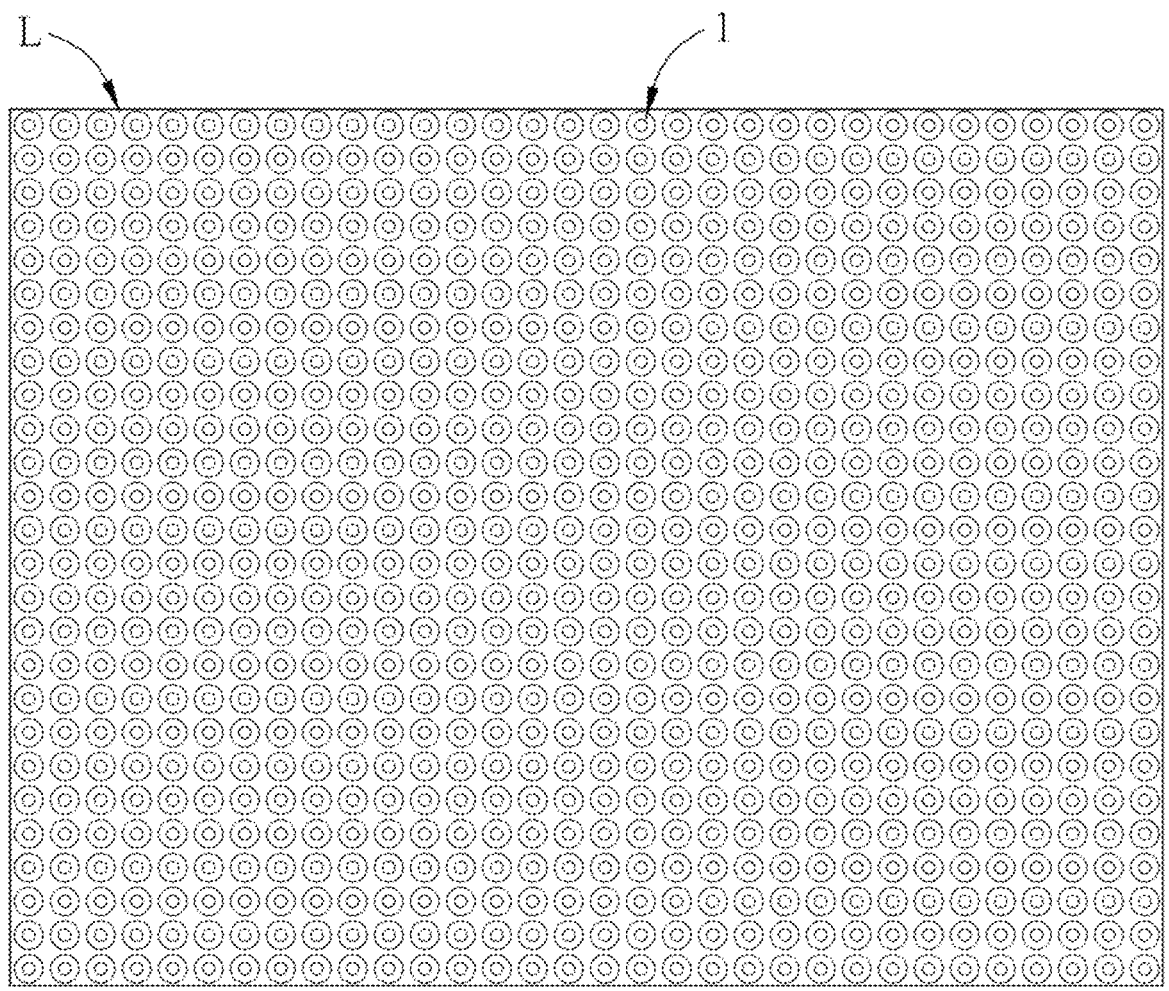
FIG. 1B is a schematic view of the metalens array of the light field camera in FIG. 1A.
Figure 1C:
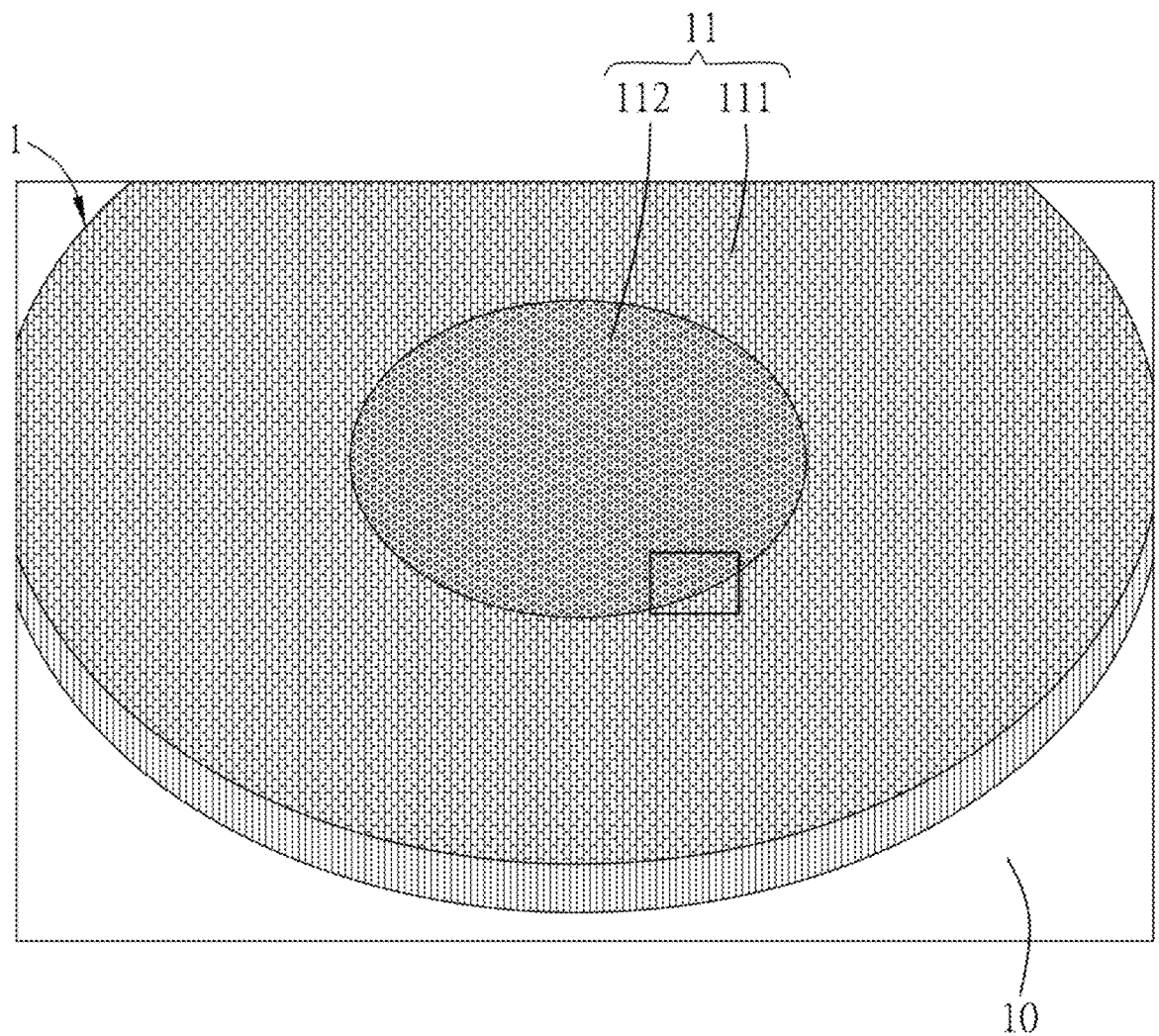
FIG. 1C is the schematic view of the metalens shown in FIG. 1B.
Figure 1D:
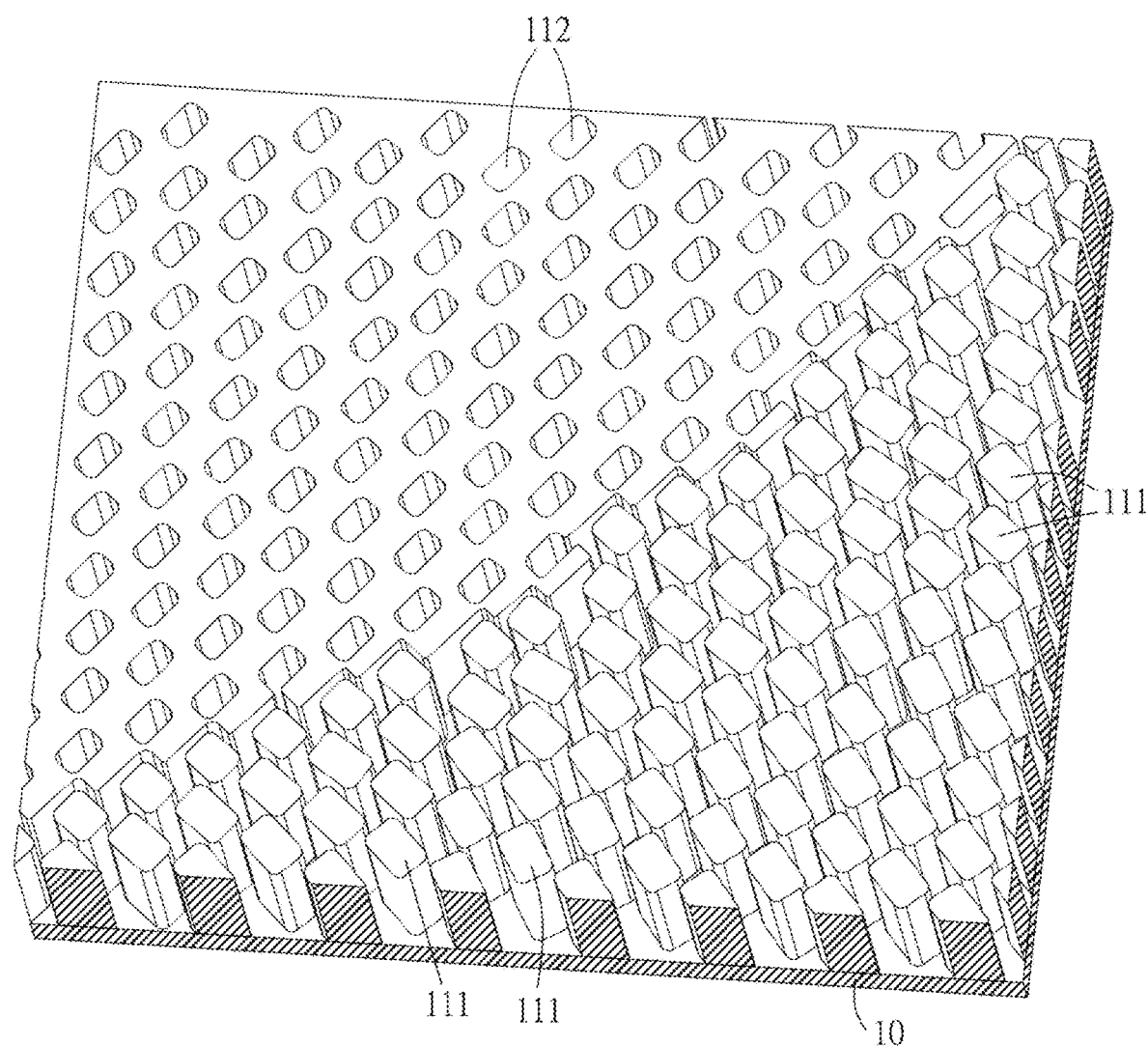
FIG. 1D depicts an enlarged tilted view of the down-right square section on the metalens 1 shown in FIG. 1C.
Figure 7:
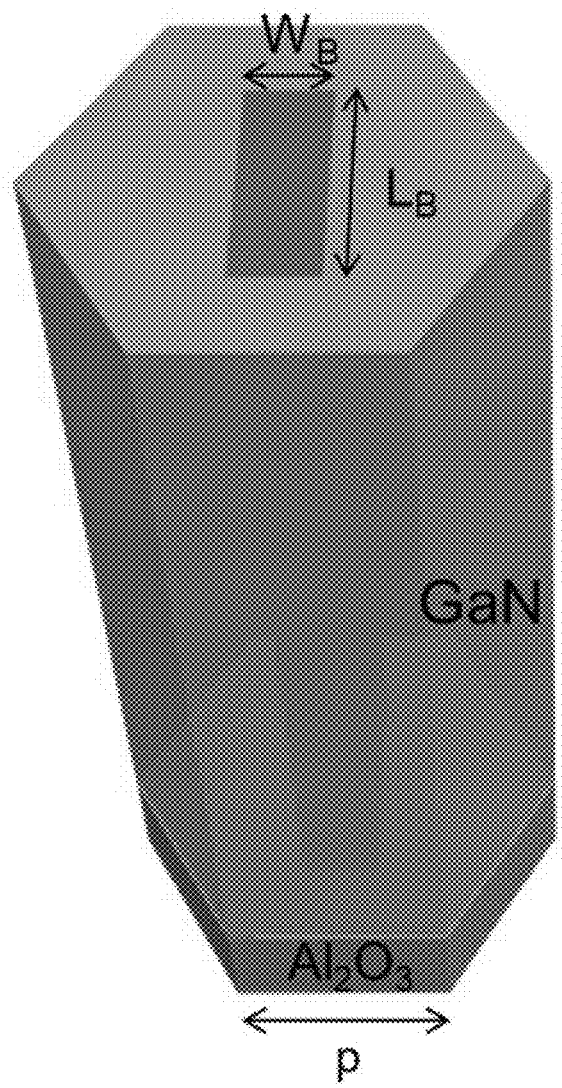
FIG. 7: Schematics of the building blocks of GaN-based achromatic metalenses. Two kinds of building blocks with height of 800 nm are used, inverse and solid structures. The lattice constant p is 120 nm. Different combinations of feature sizes, $W_B$, $L_B$, $W_p$ and $L_p$ are considered for satisfying different phase requirements of achromatic metalenses elaborated in Supplementary Table 1.
Figure 7:
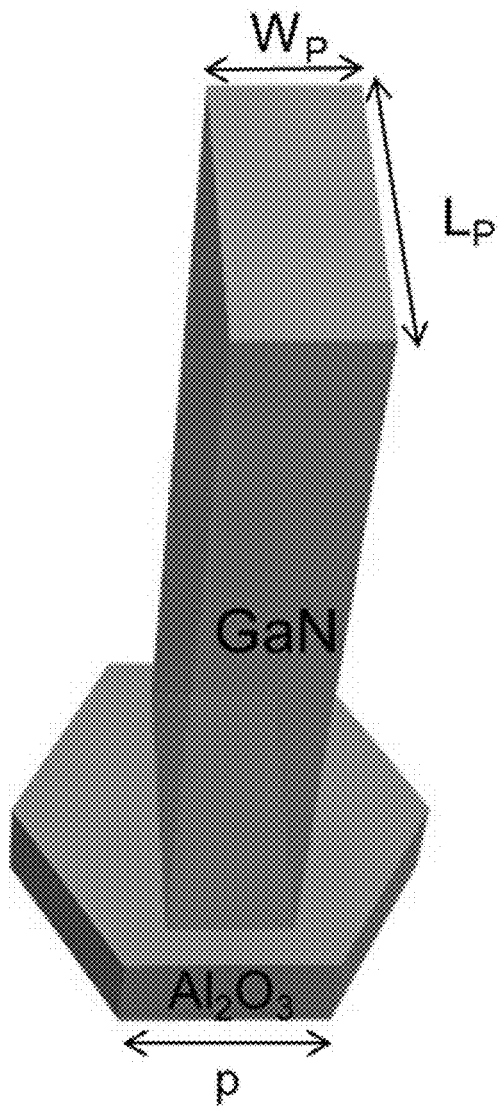
Figure 8:
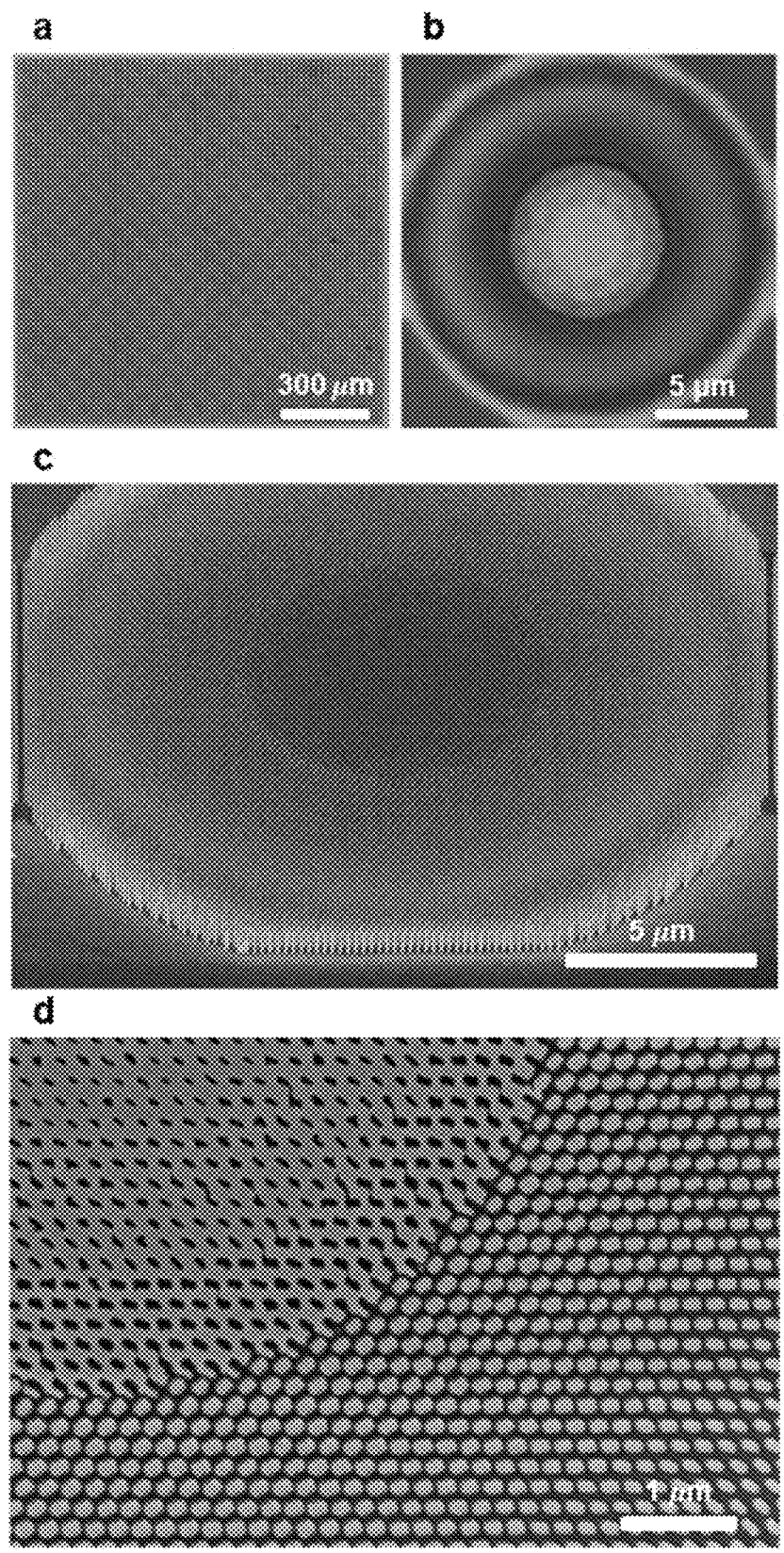
FIG. 8: Experimental verification of AMLA. (a), Optical image of the fabricated achromatic metalens array with NA=0.2157. (b), Optical image of single achromatic metalens (c), SEM image of single achromatic metalens (d), Zoomed-in SEM images at the boundary of nanopillars and inverse GaN-based structures.
Figure 9:
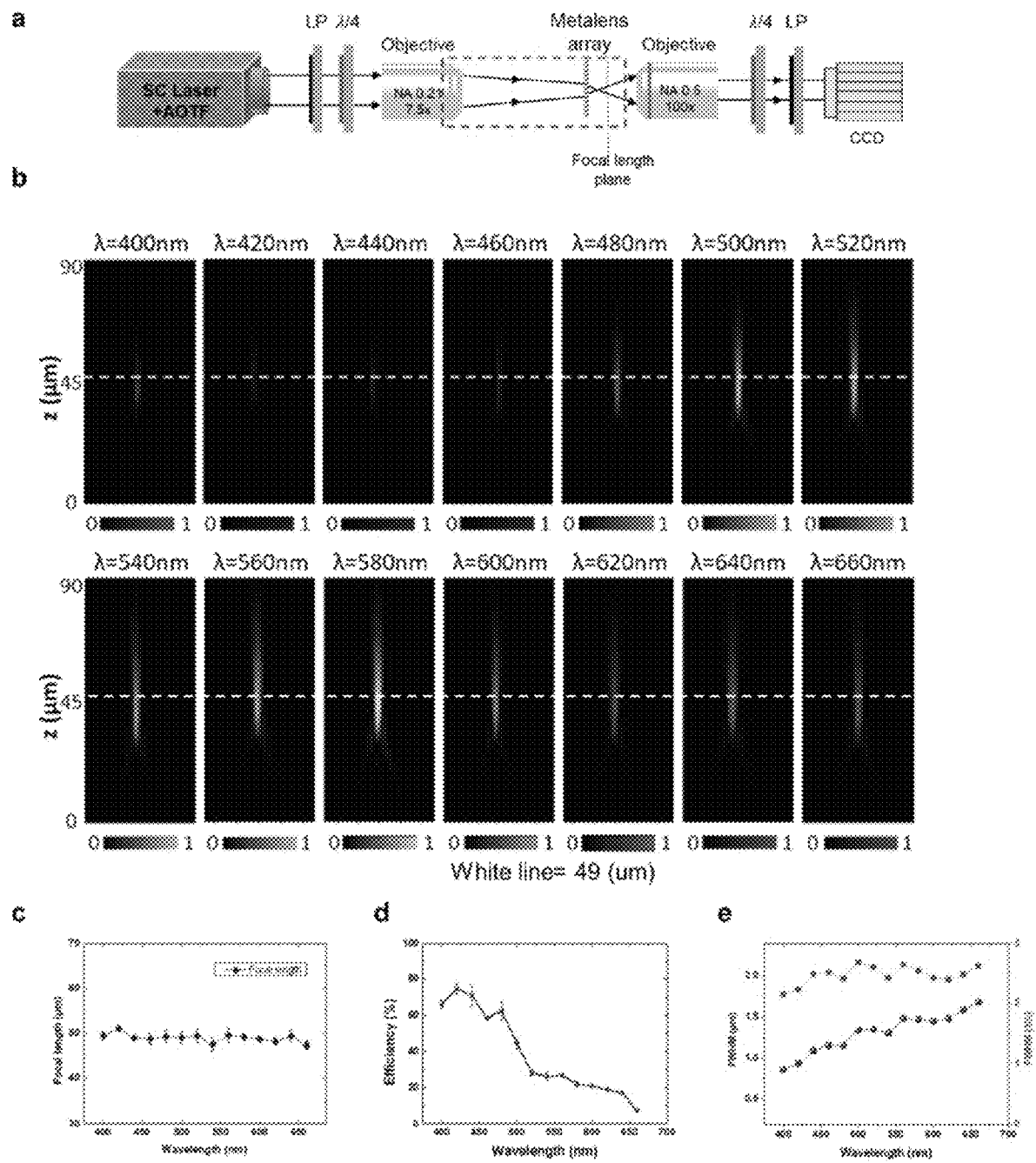
FIG. 9: Experimental verification of the single achromatic metalens. (a), Experimental setup for focusing behavior characterization (b), Experimental focusing behavior of achromatic metalens with NA of 0.2157 at various incident wavelengths. The white dashed line indicates the focal plane at 49 µm. (c), Measured focal length. (d), Operation efficiency. (e), Full width at half maximum (FWHM) of light profile. Error bars are the standard deviation of measured efficiencies from different metalenses of AMLA. The intensity pattern after the metalens is recorded step by step along propagation direction with an step of 1 µm. The efficiency is defined as the ratio of the power of the circularly-polarized light to that of the incident light with opposite handedness.
Figure 10:
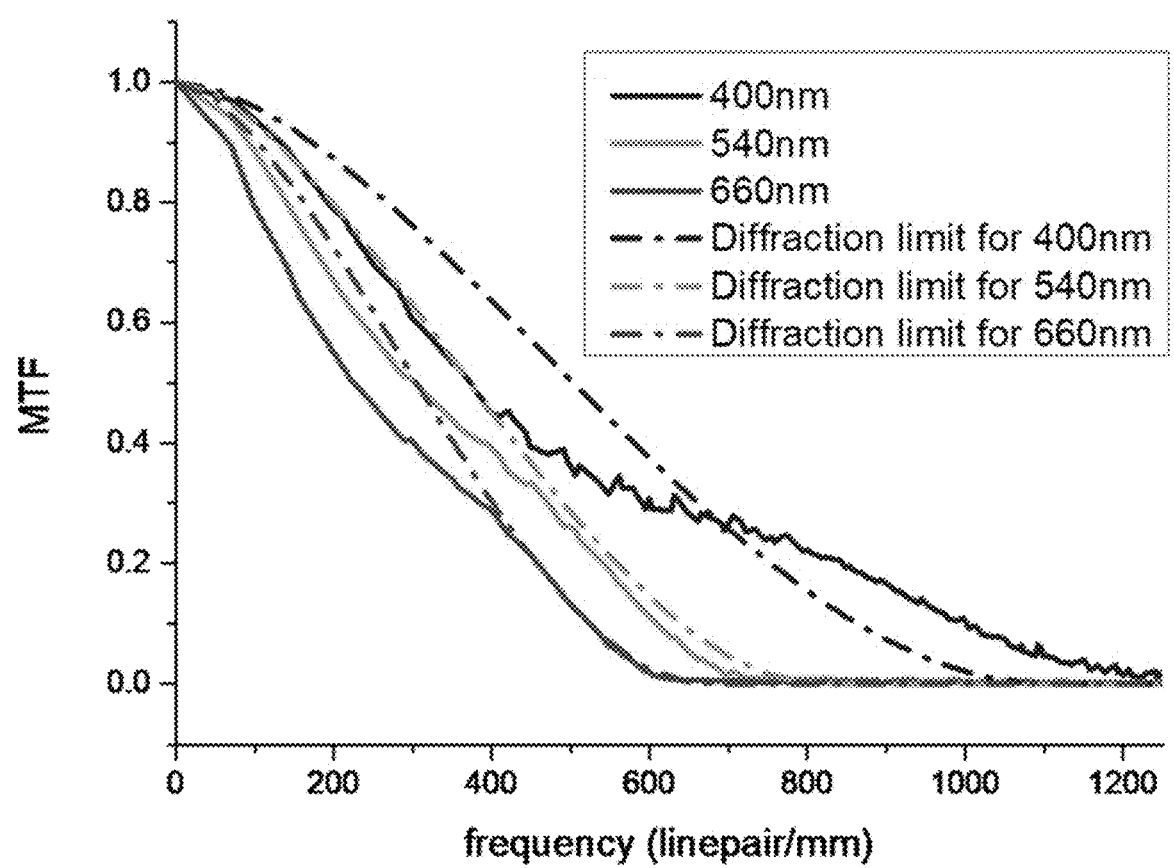
FIG. 10: The MTF curves of theoretical diffraction-limit and achromatic metalens at three wavelengths (400 nm, 540 nm and 660 nm). The MTF curves are calculated by using the Fourier transform of the point spread function (PSF).

A schematic diagram of focused light field imaging with AMLA is provided in FIG. 1A, where the reconstructing images with different focusing depths can be rendered from the sub-images captured from sensing plane. An objective is used to collect the circular polarization light onto the AMLA and forms an intermediate image in front of the AMLA. As shown in FIG. 1A to FIG. 1D, the light field imaging device M provided by the present application comprises a main lens ML, a metalens array L, and an imaging sensing unit MS. The metalens array L is disposed in alignment with the main lens ML, wherein the metalens array L comprises a plurality of metalenses 1, and each metalens 1 comprises a plurality of nanostructures 11 and a dielectric layer 10, the nanostructures 11 are disposed on the dielectric layer 10. The nanostructures 11 comprises an array of first phase compensation structures 111 and an array of second phase compensation structures 112. The array of the first phase compensation structures 111 are disposed to surround the array of the second phase compensation structures 112 so as to define a single metalens 1. As shown in FIG. 1A, the metalens array L can be a transmission type (i.e., each metalens is transparent to the incident light, which is not necessarily, but preferred, visible), each first phase compensation structure 111 and each second phase compensation structure 112 can made of a transparent material with high refractive index. For example, the transparent material with high refractive index is selected from a group consisting of gallium nitride (GaN), gallium phosphide (GaP), aluminum arsenide (AlAs), aluminum gallium arsenide (AlGaAs), titanium dioxide ($TiO_2$), silicon (Si), and silicon nitride ($Si_3N_4$). Also, the dielectric layer can be made of a dielectric material. For example, the dielectric material is selected from a group consisting of ITO, Al:ZnO (AZO), Ga:ZnO (GZO), $MgF_2$, $HfO_2$, $Si_3N_4$, $SiO_2$ or $Al_2O_3$. For example, the AMLA is composed of an array of 60×60 single meta-lens with a designed focal length f=49 µm, diameter d=21.65 µm and NA=0.2157. The ability to eliminate the chromatic aberration of our meta-lens is related to introduction of the phase compensation to meta-lenses which is based on our previous works (59). In this way, the phase requirement of achromatic meta-lenses, $\varphi_{AL}$, can be described as Eq. (1) with an additional phase shift:

$$\varphi_{AL}(r, \lambda) = -\left[\frac{2\pi}{\lambda}\left(\sqrt{r^2 + f^2} - f\right)\right] + \varphi_{shift}(\lambda) \quad (1)$$

where $r=\sqrt{x^2+y^2}$, $\lambda$, f and $\varphi_{shift}$ with are the distance between an arbitrary point and the center of meta-lens surface, incident wavelength, focal length of meta-lens and the additional phase shift for phase compensation, respectively. The solid and inverse GaN nano-antennas with different geometries as low-loss and high refractive index building blocks, which are considered as waveguides supporting various higher order modes with different phase retardations, are arranged for realizing the phase requirement on sapphire substrate. A single achromatic meta-lens is composed of over 9000 GaN nano-antennas. Their details of structural parameters are elaborated in FIG. 7 and Table 1. The AMLA is fabricated by using standard electron beam lithography and several hard mask transfer and etching processes (see Methods section in Supplementary information for details). Their corresponding SEM images are shown in FIGS. 1b-d. From the top view, the fabricated meta-lens array show well-defined nano-pillars and inverse structures exhibiting a great fidelity to our design. More details of the characteristics of meta-lens including the optical images, different viewpoint SEM images, focal length, efficiency and full width at half maximum (FWHM) can be found in FIG. 8 and FIG. 9. As design, the focal length maintain the same value at different wavelength from 400 nm to 660 nm, realizing a broadband achromatic properties in visible region. The highest efficiency can be up to 74.78% at wavelength of 420 nm, while the average efficiency is about 39% over the whole working bandwidth. The inconsistency of efficiencies for different wavelengths can be attributable to the fluctuation of efficiency each building block, NA of meta-lens, and the intrinsic loss of GaN (61). To verify the resolving power of our imaging system, the modulation transfer function (MTF) is also calculated shown in FIG. 10. The AMLA forms various sub-images with 4-dimensional radiance information from each meta-lens at sensing plane. The position of AMLA for focused light field imaging follows the Gaussian lens formula:

$$\frac{1}{a} + \frac{1}{b} = \frac{1}{f_{metalens}} \quad (2)$$

where $f_{metalens}$, a and b are the focal length of single metalens, distance from main lens image plane to AMLA and the distance from metalens array to sensing plane, respectively.

Preferably, as shown in FIG. 1C and FIG. 1D, the array of the first phase compensation structures 111 may surround the array of the second phase compensation structures 112 concentrically. The first and second phase compensation structures 111, 112 are complementary to each other and substantially satisfy the Babinet's principle. Each of the first phase compensation structures 111 can be a nanopillar while each of the second phase compensation structures 112 is a nanopore. The size and shape of each nanopore are substantially equal to the sizes and shapes of the nanopillars. The array of the second phase compensation structures 112 have bodies that are void where the array of the first phase compensation structures 111 are solid.

The sum of the radiation patterns caused by the first and second phase compensation structures 111 and 112 must be the same as the radiation pattern of the unobstructed beam, and the radiation patterns caused by the first and second phase compensation structures 111 and 112 are opposite in phase, but equal in amplitude. In such conformation, the diffraction patterns from the first phase compensation structures 111 (i.e. nanopillars) and the second phase compensation structures 112 (i.e. nanopores) are substantially identical, which satisfies the Babinet's principle.

In addition, for improving the imaging properties of the metalens array L, each metalens 1 preferably has a phase profile which satisfy the following equations (A) to (D):

$$\varphi_{AL}(r, \lambda) = -\left[\frac{2\pi}{\lambda}\left(\sqrt{r^2 + f^2} - f\right)\right] + \varphi_{shift}(\lambda) \quad (A)$$

$$\varphi_{shift}(\lambda) = \frac{a}{\lambda} + b \quad (B)$$

$$a = \delta\frac{\lambda_{min}\lambda_{max}}{\lambda_{max} - \lambda_{min}} \quad (C)$$

$$b = -\delta\frac{\lambda_{min}}{\lambda_{max} - \lambda_{min}} \quad (D)$$

where $\varphi_{AL}$ is a phase retardation of an arbitrary point on a surface of the metalens 1, r is a distance between said arbitrary point and a center on said surface of the metalens 1, $\lambda$ is a working wavelength in free space, f is a designed focal length, $\lambda_{min}$ and $\lambda_{max}$ are the boundaries of an interest wavelength band, and $\delta$ is a largest additional phase shift between $\lambda_{min}$ and $\lambda_{max}$ at the center of the metalens. In Eq. (A), the first part $$"-\left[\frac{2\pi}{\lambda}\left(\sqrt{r^2 + f^2} - f\right)\right]"$$

is to make the incident planar wave of the metalens 1 (which is also planar), after transmitted through the metalens 1 with such designed phase profile (or phase distribution profile), to become a spherical wave converged at the distance (i.e. the focal length) f and without spherical aberration. By introducing the second part, $\varphi_{shift}(\lambda)$, in Eq. (A), the phase difference between the maximum and the minimum wavelengths within the working bandwidth (defined as phase compensation, which is a function of spatial position at metalens surface) is consequently compensated by the integrated-resonances, and the conformation of the second phase compensation structures 112 (which are inverse conformations with respect to the solid conformations of the first phase compensation structures 111) play the dominate role at the central part of the metalens 1 to make the metalens 1, with such designed phase profile, have the achromatic property.

Figure 1E:
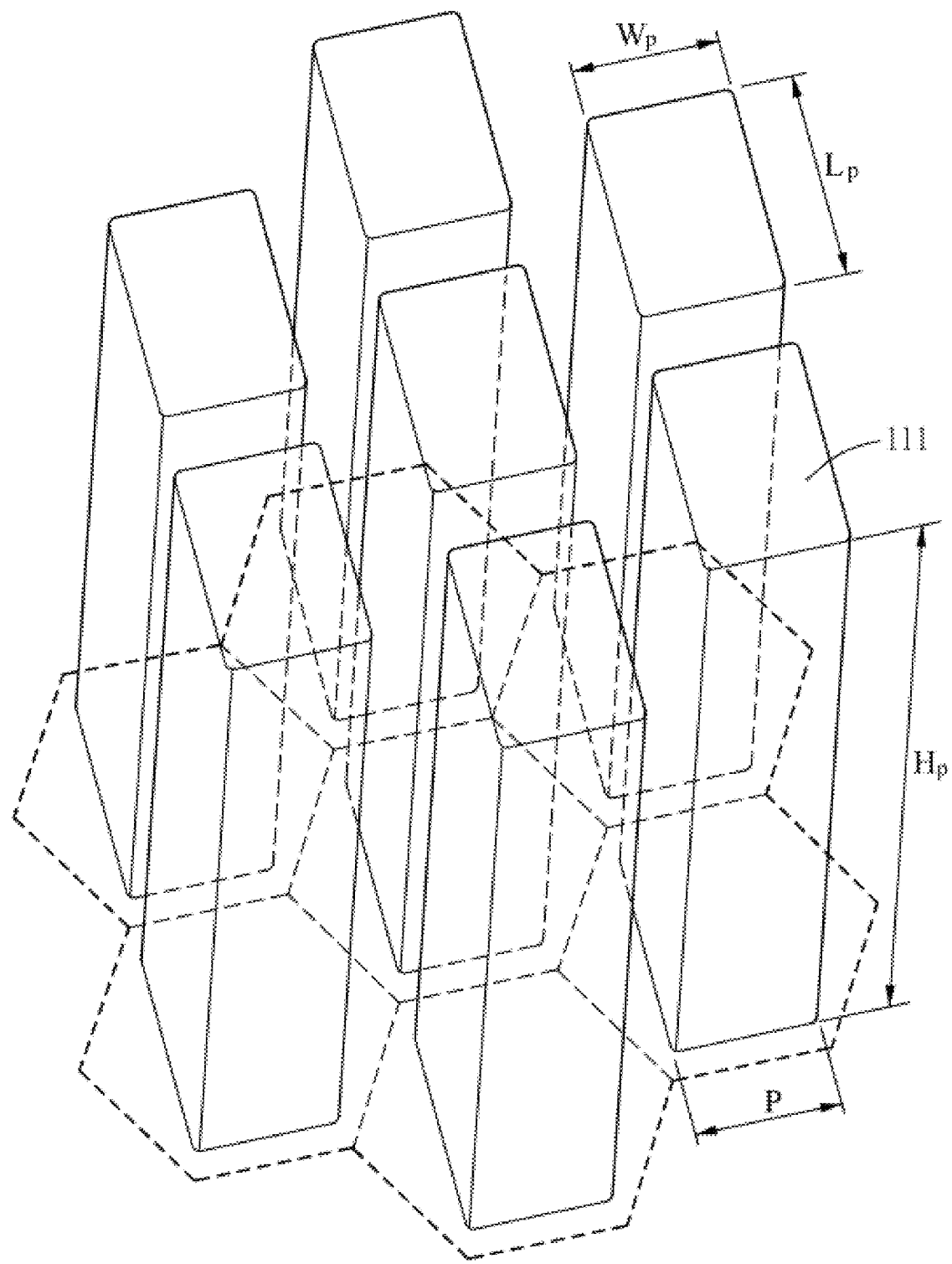
FIG. 1E is a schematic view of the first phase compensation structures (nanopillars) of the metalens shown in FIG. 1C arranged in a periodic hexagonal lattice.
Figure 1F:
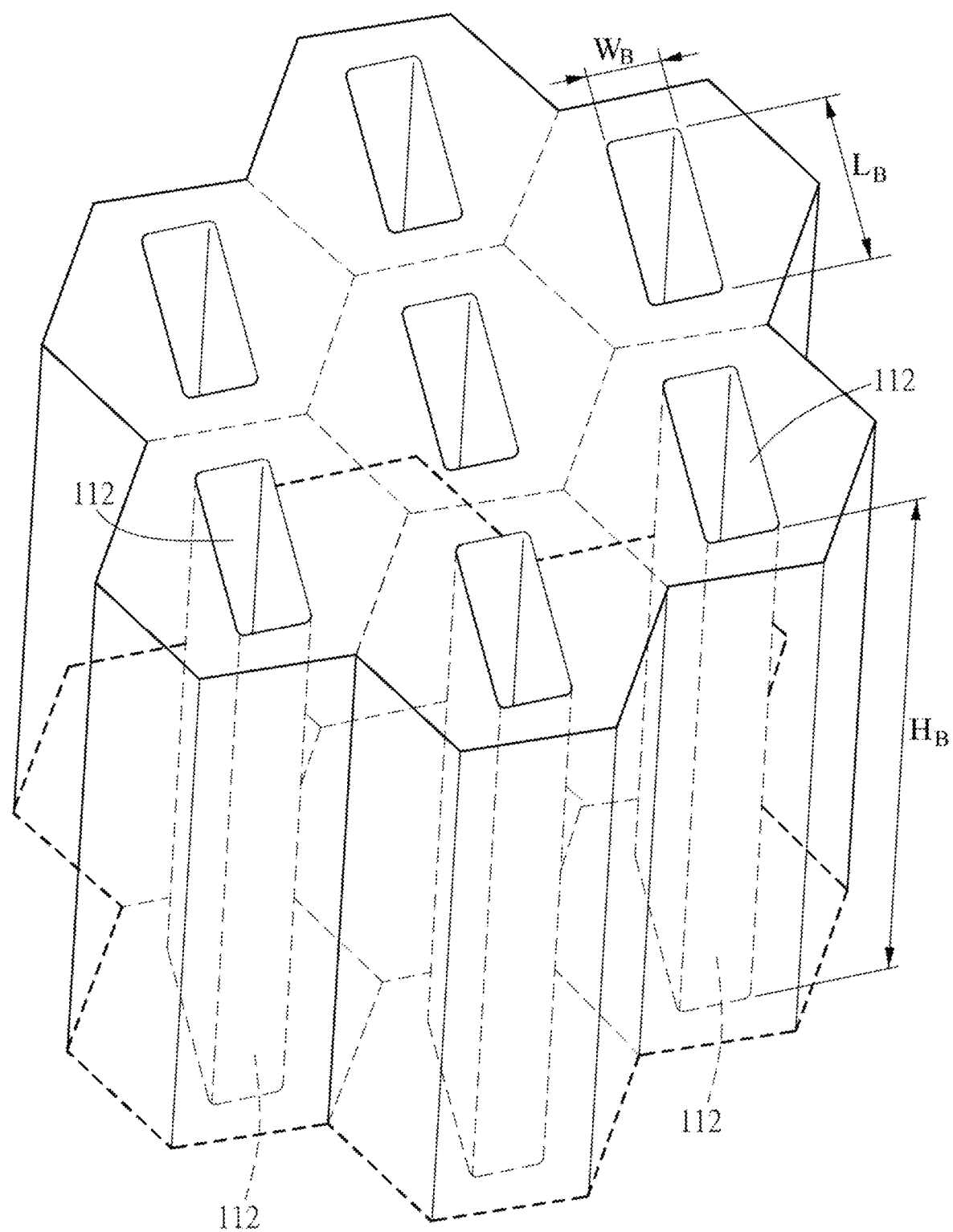
FIG. 1F is a schematic view of the second phase compensation structures (nanopores) shown in FIG. 1C arranged in a periodic hexagonal lattice.

Please further refer to FIGS. 1E and 1F, in this example, both the first and second phase compensation structures 111 and 112 are in a periodic hexagonal lattice. The dashed lines around each hexagons are only for illustration, which do not represent any real physical boundaries existing on the dielectric layer 10. For such hexagonal lattice conformation, the first and second phase compensation structures 111 and 112 may occupy the physical space as compact as possible.

In other words, more compactness of the first and second phase compensation structures 111 and 112 is, less non-working space of the metalens 1 is, and the better optical properties such metalens 1 may possess. Actually, the first and second phase compensation structures 111 and 112 may be arranged in a periodic lattice of any suitable regular polygon, such as triangle, square, pentagon, heptagon, octagon, etc. Based on such phase profile discussed in the preceding paragraph and for realizing the metalens 1 with NA=1.06, and f=235 µm which working in a bandwidth of the visible light, the first phase compensation structures 111 (i.e. nanopillar shown in FIG. 1E) may have phase compensations ranging from 660 degree (°) to 1050 degree (°) and each of these nanopillars may have a length $L_p$ ranging from 80 to 165 nm, a width $W_p$ ranging from 45 to 110 nm and a height $H_p$ of 800 nm. Also, the second phase compensation structures 112 (i.e. the nanopore shown in FIG. 1F) have phase compensations ranging from 1080 degree (°) to 1140 degree (°), and each of the nanopores may have a length $L_B$ ranging from 125 to 163 nm, a width $W_B$ ranging from 50 to 80 nm, and a height $H_B$ of 800 nm. The lattice constant P of the hexagon can be 120 nm.

Figure 2A:
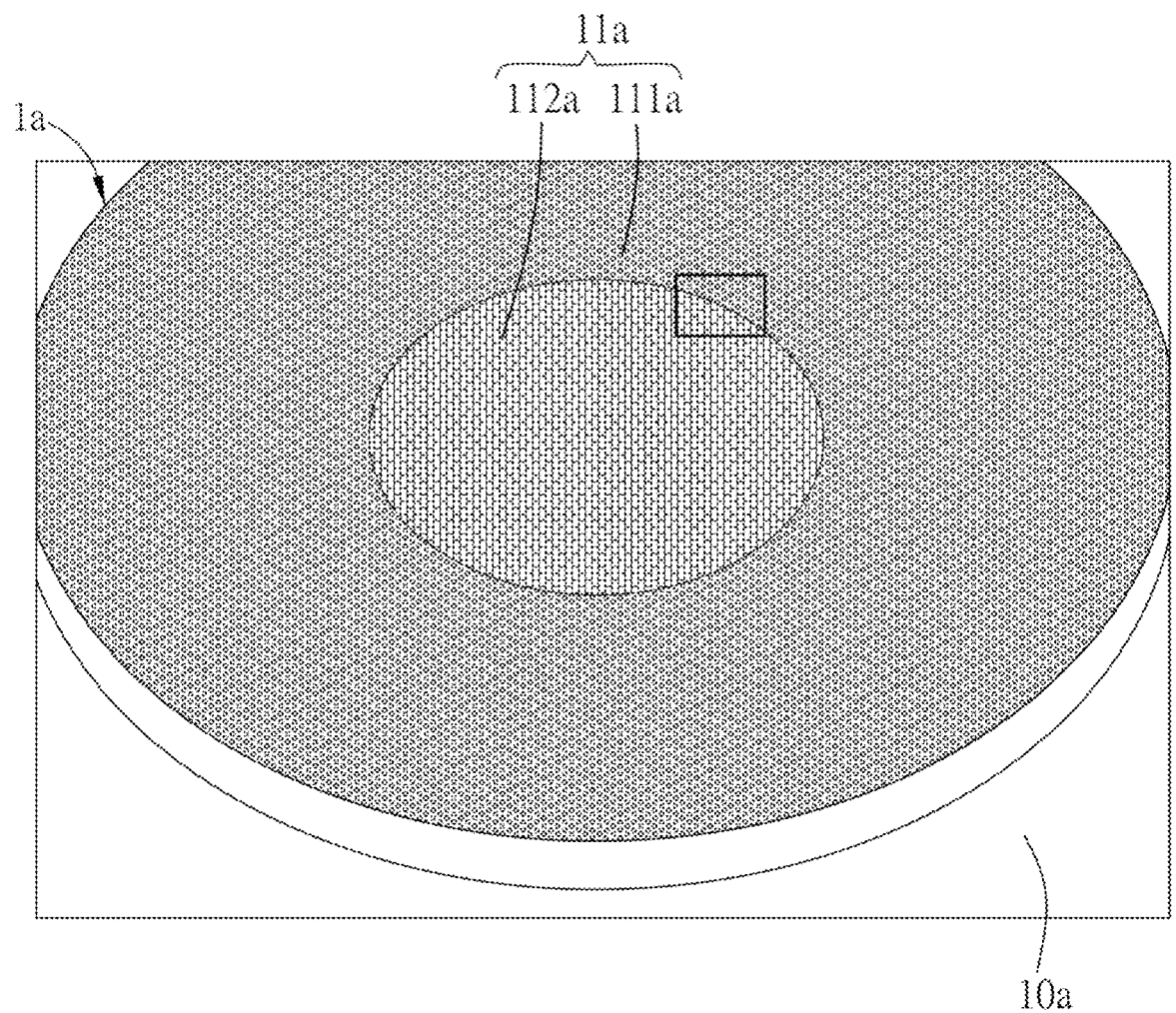
FIG. 2A is the schematic view of the metalens of the metalens array according to another embodiment of this disclosure.
Figure 2B:
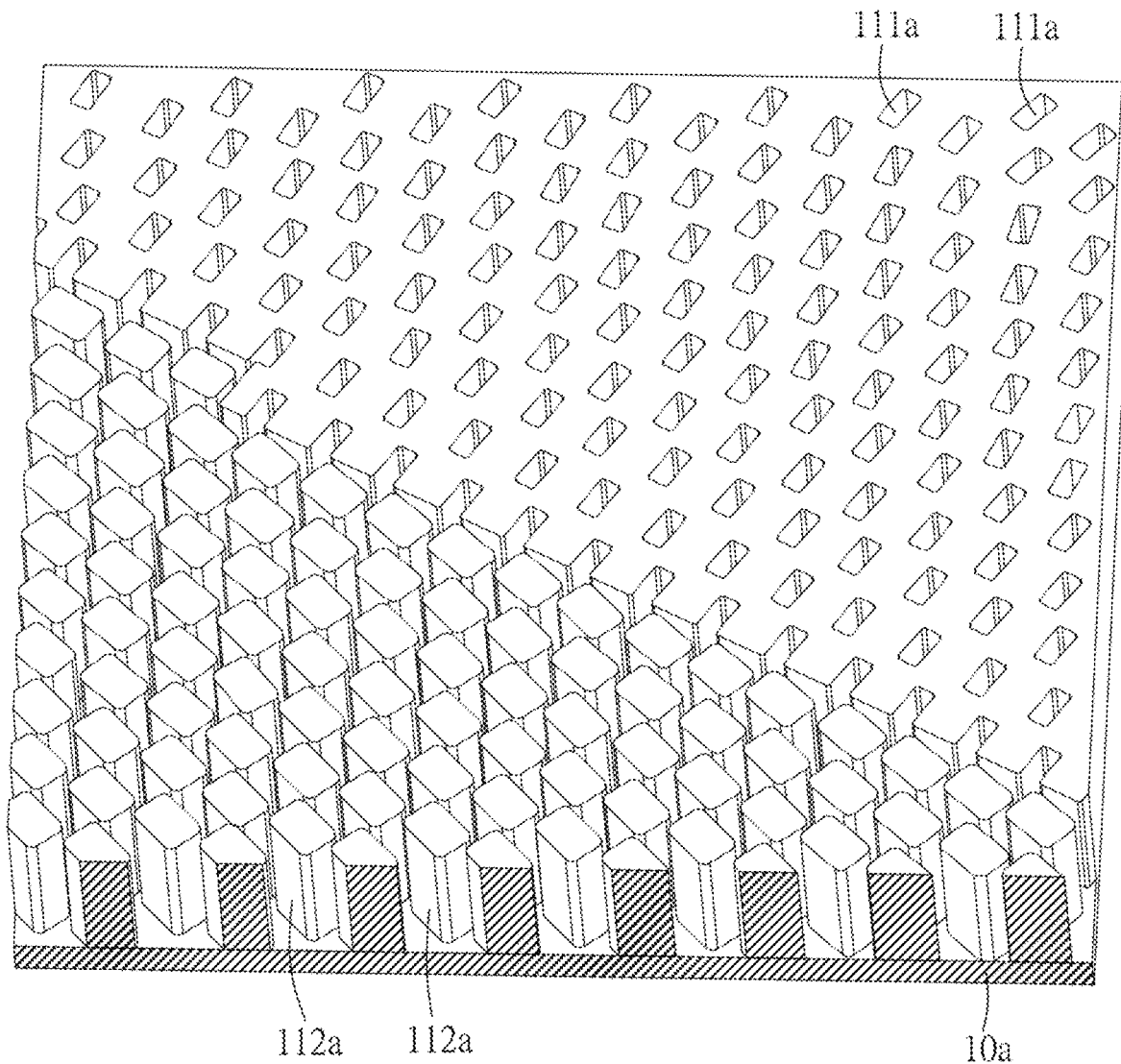
FIG. 2B depicts an enlarged tilted view of the upper-right square section on the metalens shown in FIG. 2A.

In other example, as shown in FIGS. 2A and 2B, the metalens array comprises a plurality of metalenses 1a, and each metalens 1a comprises a plurality of nanostructures 11a and a dielectric layer 10a, the nanostructures 11a are disposed on the dielectric layer 10a. The nanostructures 11a comprises an array of first phase compensation structures 111a and an array of second phase compensation structures 112a. The difference between this example and FIGS. 1C and 1D is in that the array of the first phase compensation structures 111a have bodies that are void where the array of the second phase compensation structures 112a are solid.

Moreover, although in the metalens array L according the previous embodiment all the metalenses 1 are transparent and have the same focal length, these metalenses 1 may not be necessarily identical to each other, and that they may still have various focal lengths according to various practical needs. In other words, in the same metalens array L, at least one of the metalenses 1 may have different focal length different from other metalenses 1. The size, conformation, suitable materials, variation or connection relationship to other elements of each detail elements of the metalens array L can refer to the previous embodiments, and they are not repeated here.

Light Field Imaging with AMLA

Figure 3:
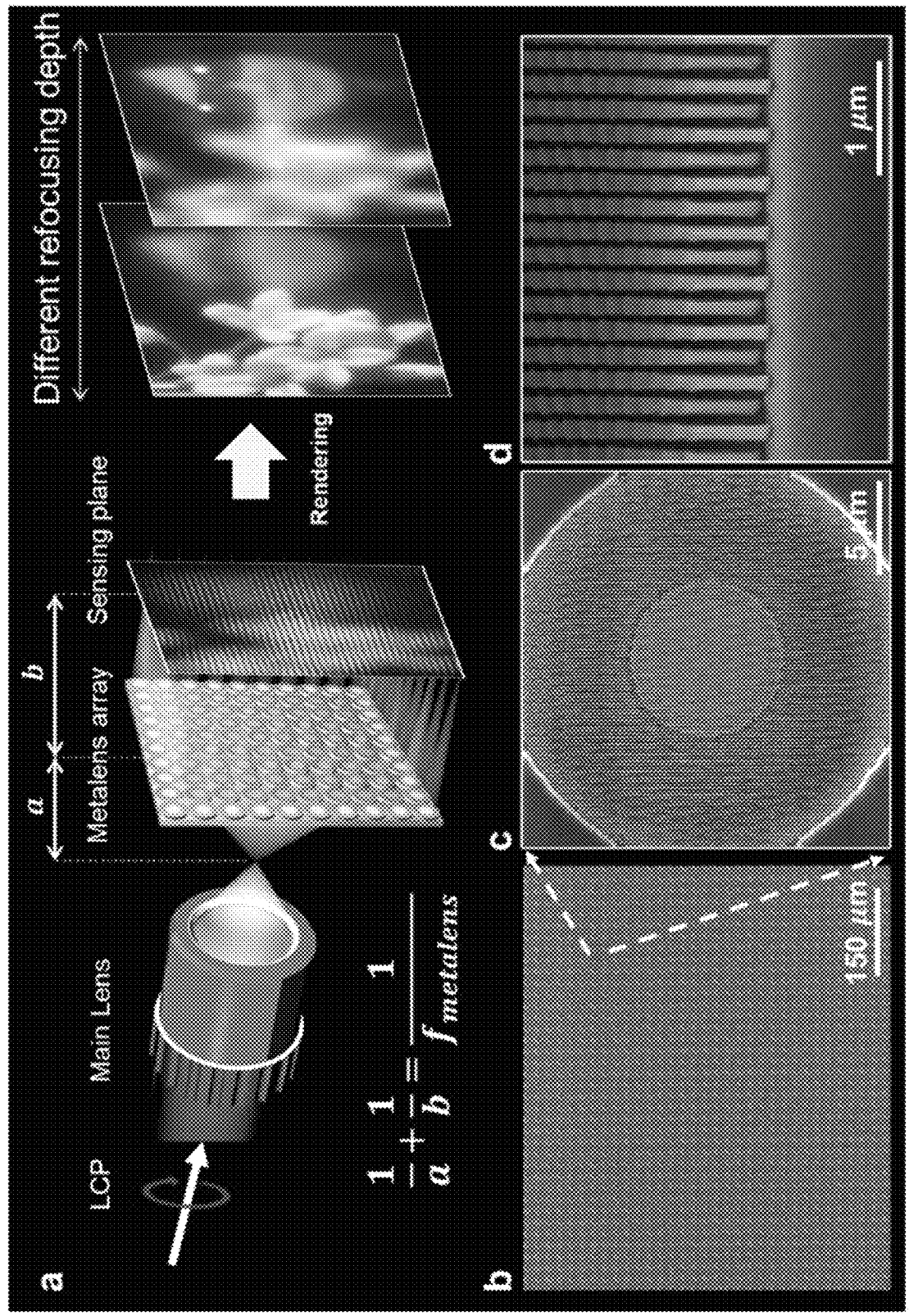
FIG. 3 Light field imaging with metalens array. (a), The schematic diagram of light field imaging with meta-lens array and rendered images. (b), SEM images of AMLA with NA=0. 2157. (c), Zoomed-in SEM images of single meta-lens with nano-pillars and inverse GaN-based structures. (d), Tilted-view zoom-in image of GaN nano-pillars.
Figure 4:
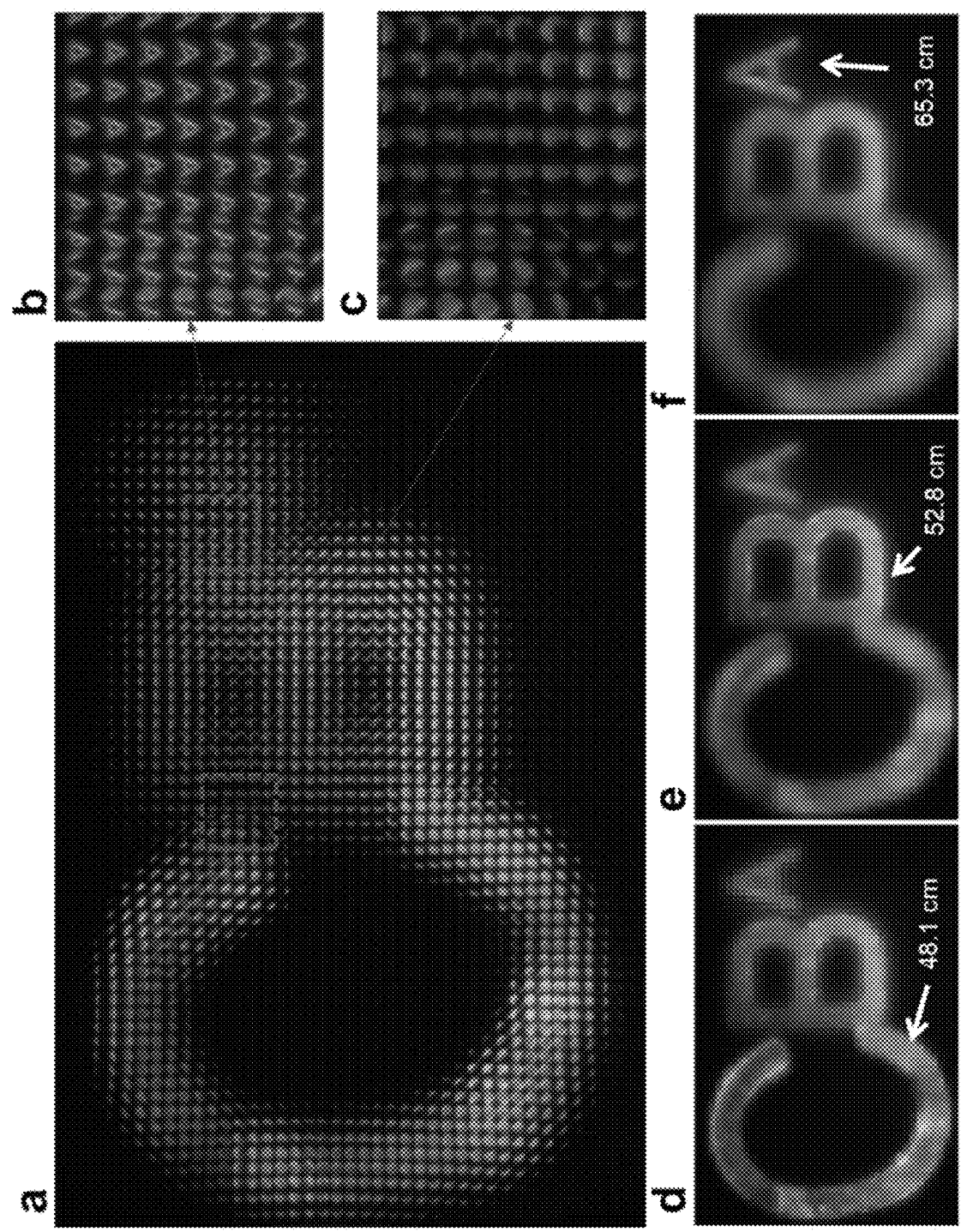
FIG. 4 Characteristics of the radiance captured by the focused meta-lens array light field imaging system. (a), The raw light field image with AMLA. The three letters made from plastic are arranged orderly in the intermediate image space with halogen lamp irradiation (purple C, green B, and yellow A). (b, c), Zoomed-in images of image a. (d-f), The rendered images with different focusing depths of 48.1 cm, 52.8 cm and 65.3 cm.
Figure 11:
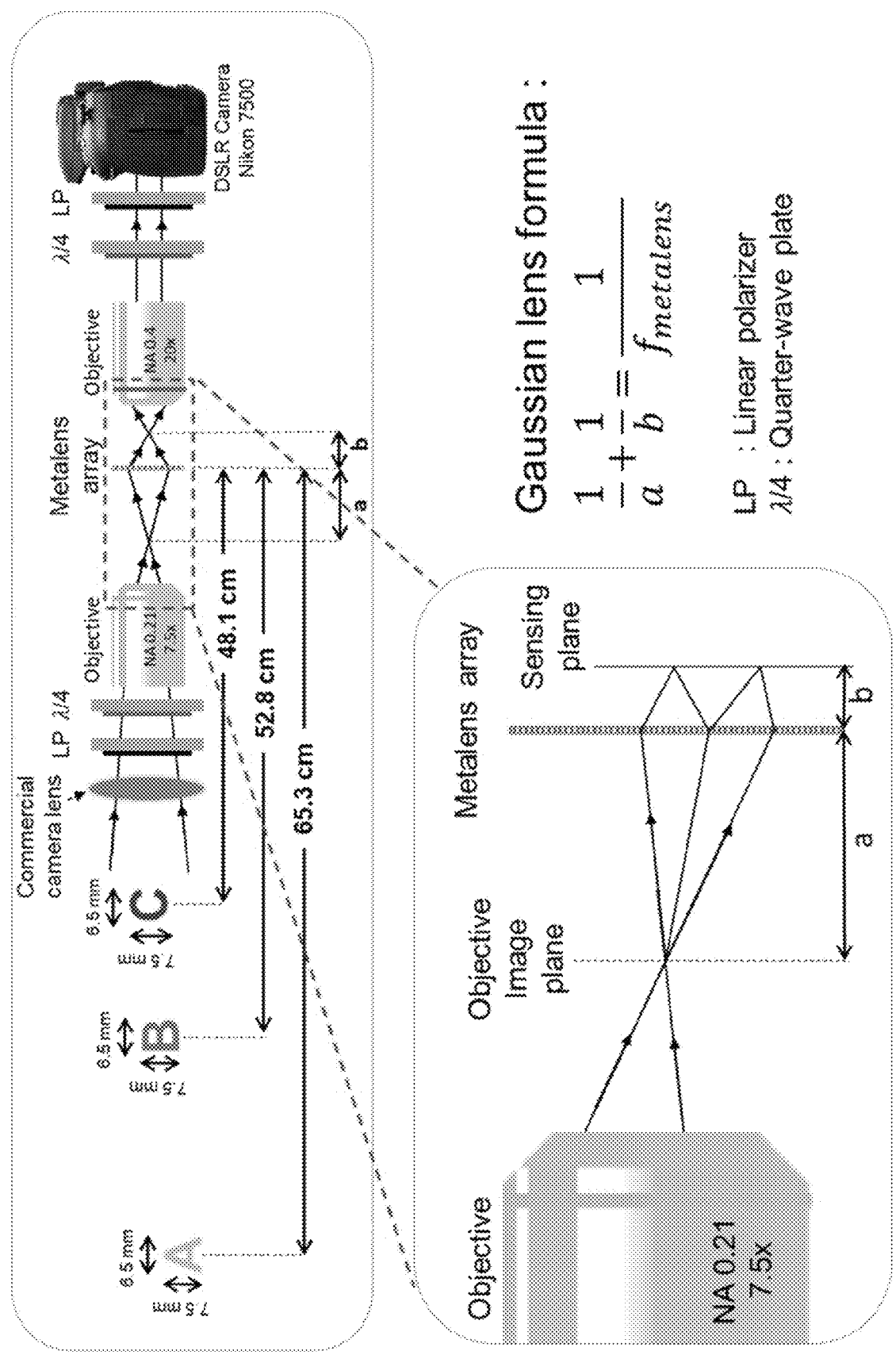
FIG. 11: Schematic layout of focused light field microscopy with AMLA. A halogen lamp is used as the broadband light source to brighten the target object. The circularly polarized light is generated through a linear polarizer and a quarter-wave plate. An objective (7.5× magnification, NA=0.21, Mitutoyo) is used to collect the light onto the achromatic metalens array and another objective (20× magnification, NA=0.4, Mitutoyo) is used to form the reimaging image from the AMLA onto the camera (Nikon 7500). The position of metalens array for focused light field follows the Gaussian lens formula: $1/a+1/b=1/f$, where f is the focal length of single metalens. a and b is the distance from main lens image plane to metalens array and the distance from metalens array to reimaging plane, respectively.

FIG. 3 Light field imaging with metalens array; (a), The schematic diagram of light field imaging with meta-lens array and rendered images; (b), SEM images of AMLA with NA=0.2157; (c), Zoomed-in SEM images of single meta-lens with nano-pillars and inverse GaN-based structures; (d), Tilted-view zoom-in image of GaN nano-pillars. FIG. 4(a) shows the focused light field image captured by digital single-lens reflex camera (DSLR) with AMLA from three letter objects arranged orderly with halogen lamp irradiation (purple C, green B, and yellow A). The experimental setup used for focused light field imaging is shown in FIG. 11. The distance from main lens image plane to meta-lens array and the distance from meta-lens array to sensing plane are 300 µm and 58.5 µm, respectively, which are determined by apertures of meta-lens, sensor pixel size and the depth range of the scene. The heights of all objects in this scene are 7.5 mm. FIG. 4(a) consists of 55×40 sub-images showing the different perspectives of the scene. An individual sub-image comprises of 87 pixels. The part of inverted image of letters in sub-images can be observed in FIGS. 4(b) and 4(c), the portion of FIG. 4(a), on the boundary between two letters. The quality of every single sub-image is clear and easy to distinguish. The rendering algorithm for constructing the scene is shown in Method section, which can arbitrarily render the images with different focusing depths. FIGS. 4(d-f) are the reconstructed images at different focusing depths of 48.1 cm, 52.8 cm and 65.3 cm, respectively. The artifacts, the checkerboard effect, can be found on the other unfocusing objects, which are the features of focused light field imaging.

Depth Calculation and Moving Object Light Field Imaging

Figure 5:
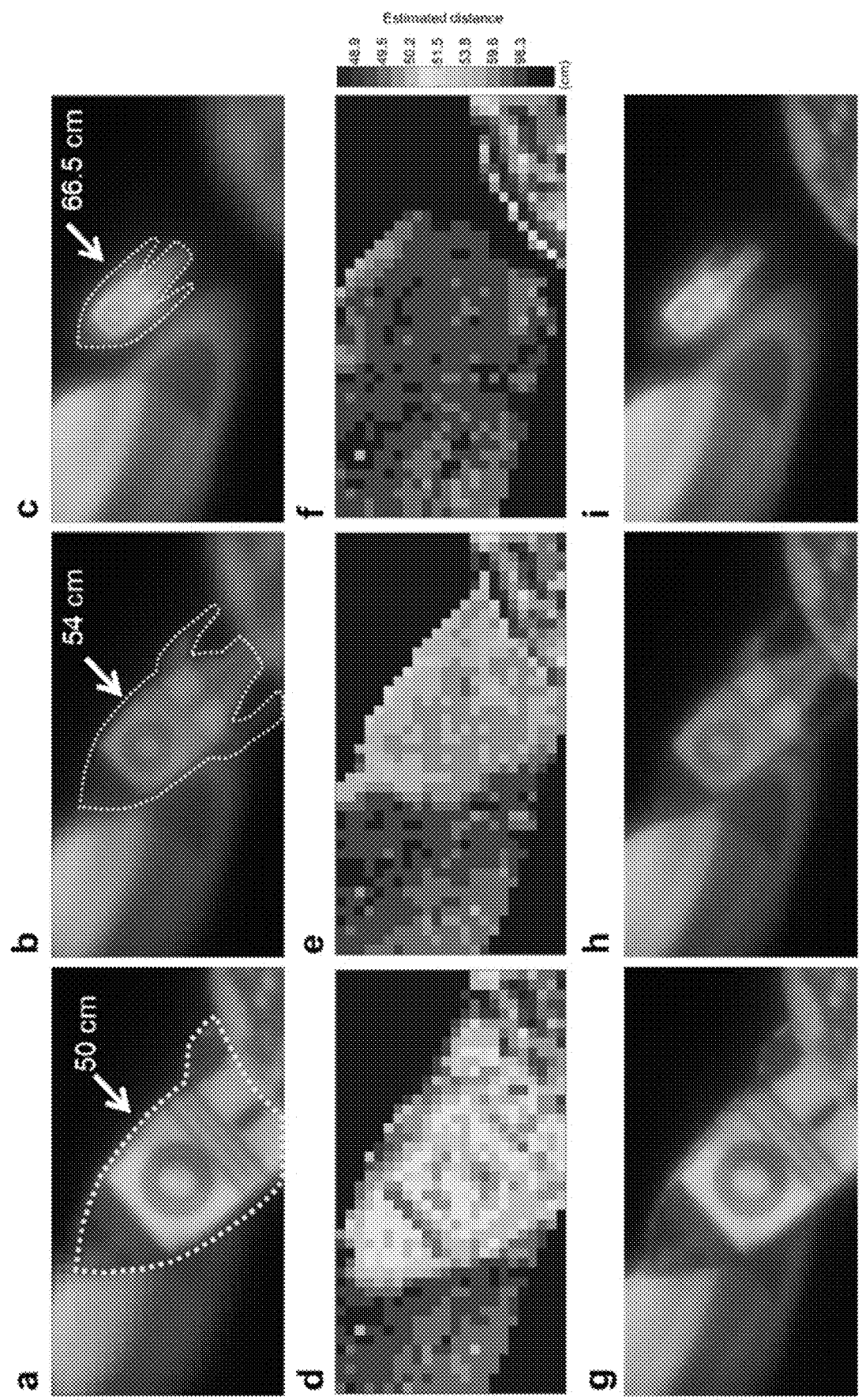
FIG. 5 Depth estimation of the scene of combination of earth (front), rocket (middle) and Saturn (rear). (a-c), The rendered images focusing on the rocket with different depth of 50 cm, 54 cm and 66.5 cm. (d-f), The estimated depth map corresponding to image a, b, c. (g-i), The rendered all-in-focus images with the rocket at different position between earth and Saturn.
Figure 12:
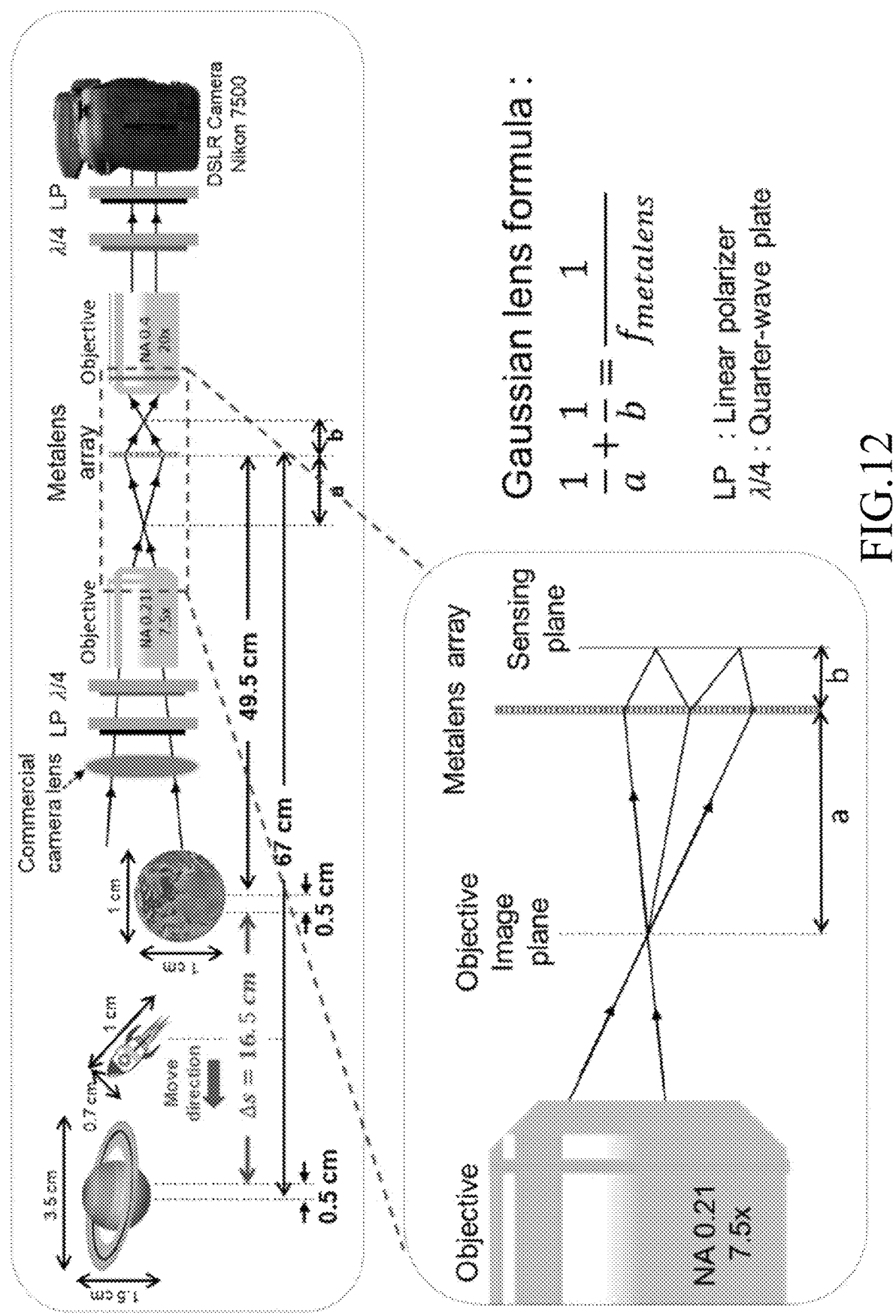
FIG. 12: Schematic layout of focused light field microscopy with AMLA for the scene of combination of earth, rocket and Saturn. A white light LED source is used as the broadband light source to brighten the target object.
Figure 16:
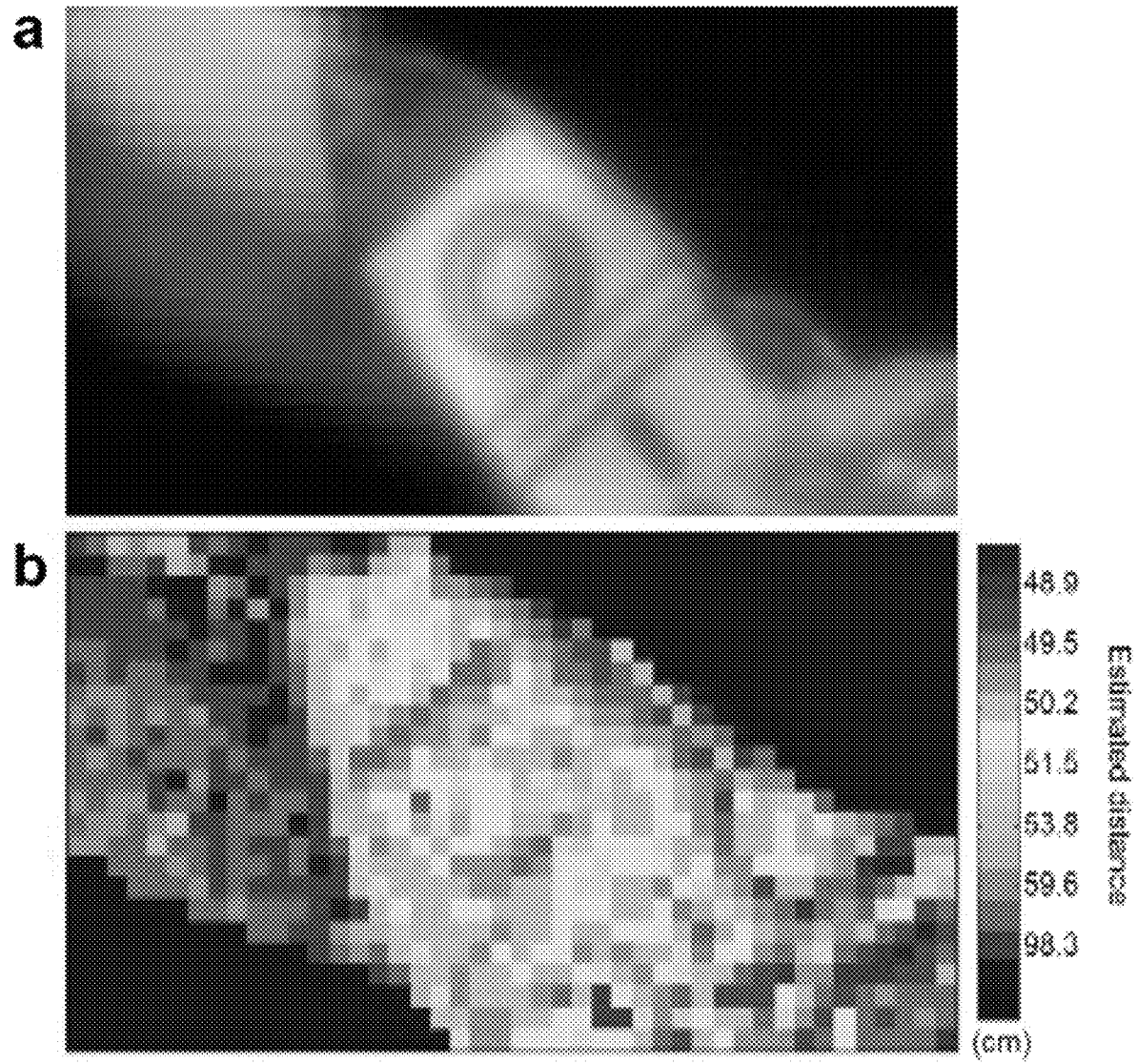

The scene of FIG. 5 consists of three objects (pattern of earth, rocket and Saturn made of paper) at different depths. FIGS. 5(a-c) to c are the rendered images focused on the rocket at different depths of 50 cm, 54 cm and 66.5 cm, and FIGS. 5(d-f) are the corresponding estimated depth map. The focused light field imaging setup is shown in FIG. 12. The earth-to-AMLA and Saturn-to-AMLA distances are fixed at 49.5 cm and 67 cm, respectively. The rocket is set as the linear moving target with constant moving velocity and mounted on a linear stage (ODL220/M, Thorlab) with the speed of 1 cm/s and resolution of 2 µm. The depth information can be derived from the disparities between adjacent sub-images, of which algorithm for the depth estimation is described in Method section. As shown in FIG. 5(d), when the rocket is next to the earth, the average depth value of rocket (49.8 cm) is close to that of earth (49.5 cm). When the rocket is moving towards the Saturn, its calculated depth is also increasing. The results clearly demonstrate that the light field imaging with AMLA has the ability to evaluate the depth of multi-objects. Moreover, the real-time displaying of the rendering images and depth maps is shown in FIG. 16. More importantly, when the positions of multi-objects can be evaluated, their relative speed also can be detected. After getting the depth information, we can use them to optimize the patch sizes for different depths and to render the refocused all-in-focus images without artifacts which can be regarded as an image captured from an infinite depth of field (DOF) system shown in FIGS. 5(g-i).

Imaging Performance Using a USAF Resolution Test Chart

Figure 6:
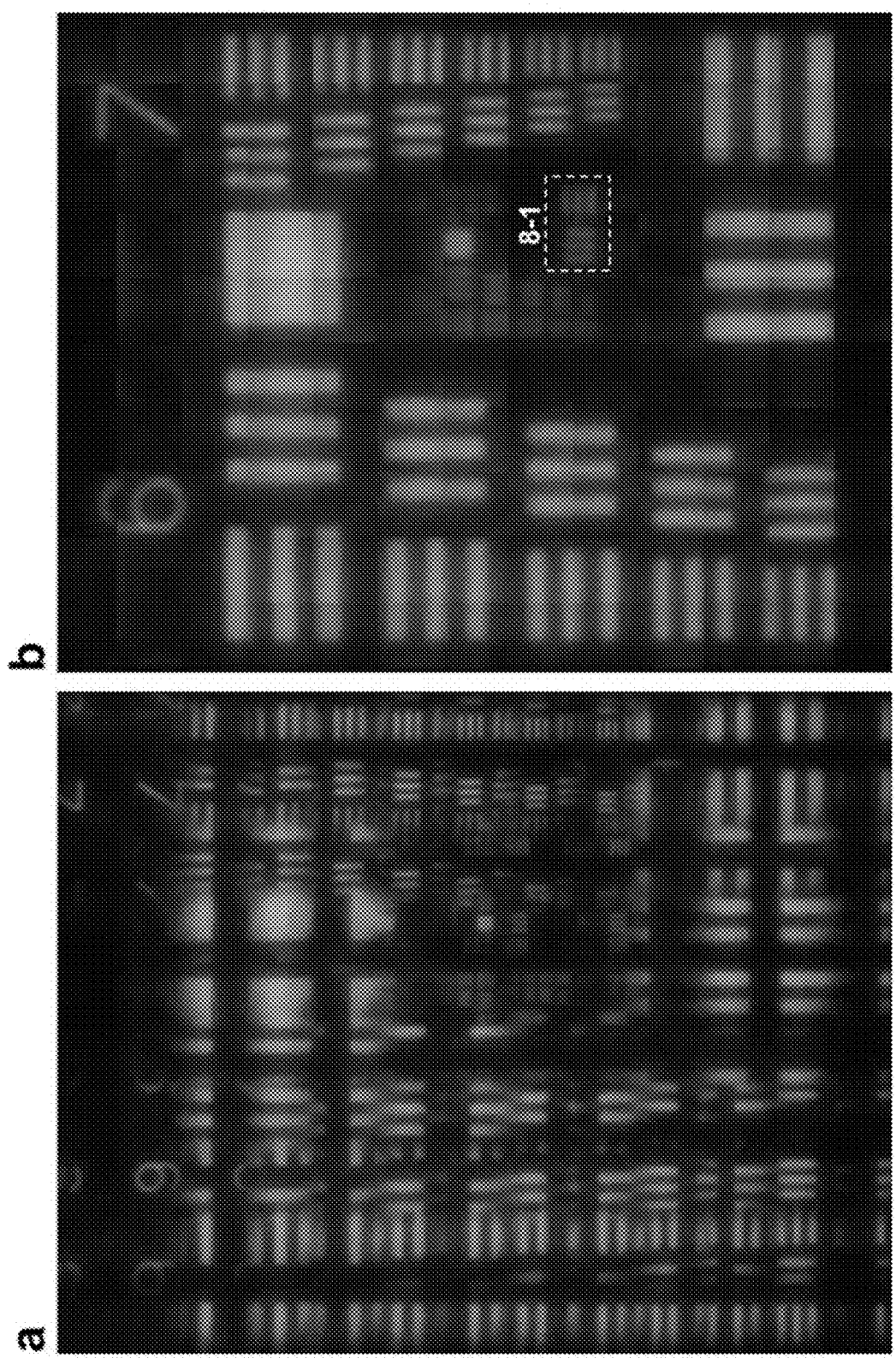
Figure 13:
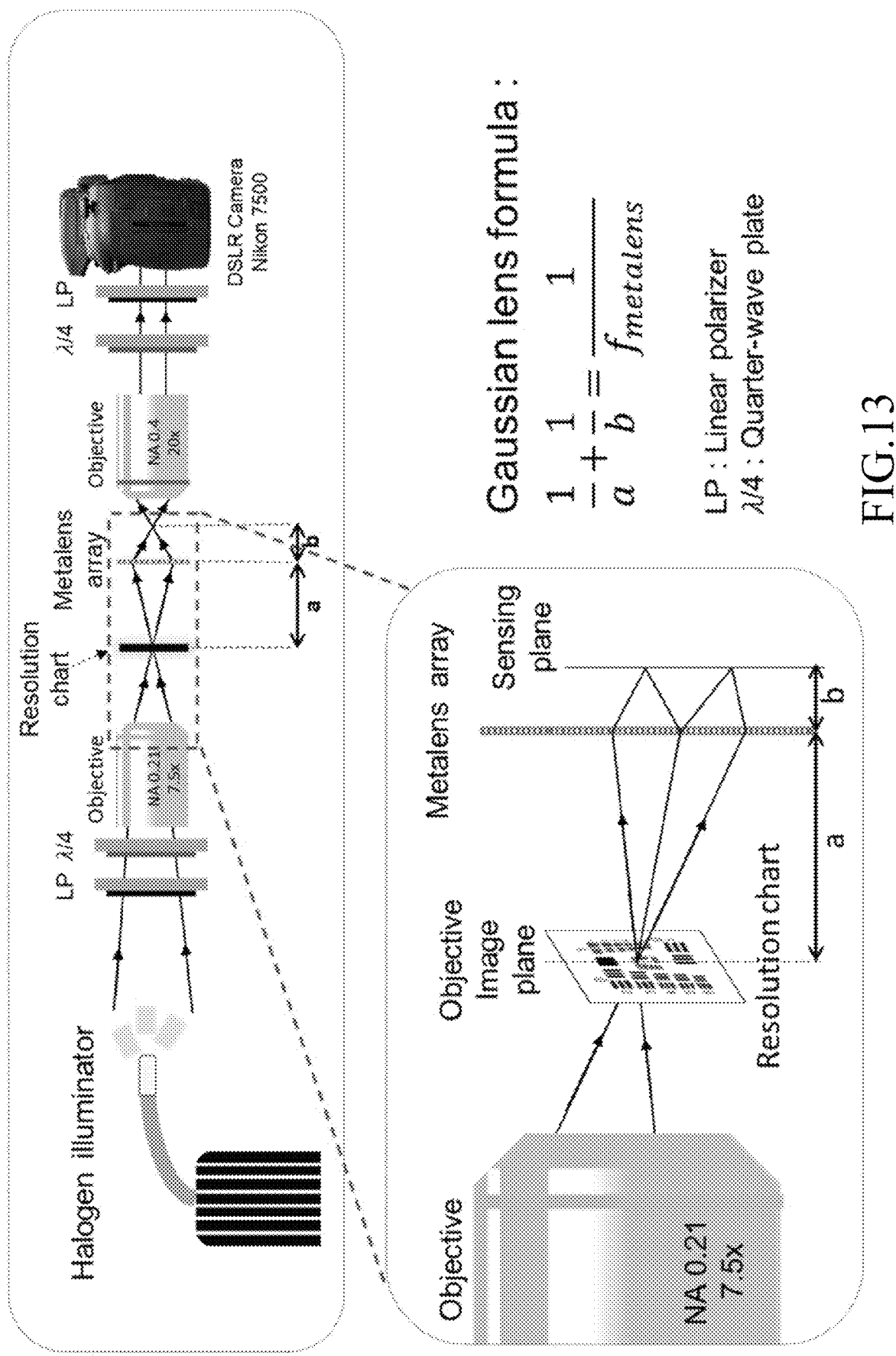
FIG. 13: Schematic layout of focused light field microscopy with AMLA for lateral resolution test. A 1951 USAF resolution test chart is placed in front of AMLA. A halogen lamp used as the broadband incoherent light source is collimated by an objective (7.5× magnification, NA=0.21, Mitutoyo) to brighten the resolution test chart. The feature sizes of grating structures on the resolution chart are from 2000 µm to 0.55 µm. The image of resolution chart is projected to AMLA. Another objective (20× magnification, NA=0.4, Mitutoyo) is used to relay the image information passing through the AMLA to the camera (Nikon 7500).

To assess the imaging resolution limits of AMLA, the 1951 United State Air Force (USAF) resolution test chart, the typical resolvable structure, is used as a target object. The resolution test chart is illuminated by a broadband incoherent light source, a halogen lamp. The optical measurement configuration is shown in FIG. 13. FIG. 6(a) shows the light field image formed by ALMA in which each sub-image of single meta-lens unit has the individual information of the target object. The reconstructed image is shown in FIG. 6(b), after the rendering process. The smallest feature of objects that could be resolved is 1.95 µm in linewidth (group 8, element 1), which is identified by Rayleigh criterion and indicates the precise fabrication of the ALMA.

CONCLUSION

Light field image acquired by an array of 60×60 GaN achromatic meta-lenses with their focal length of 49 µm, diameter of 21.65 µm and NA of 0.2157 clearly demonstrates multi-dimensional optical information including full-color imaging and depth. Precise design and fabrication of 33,660,000 GaN resonators in our meta-lens array allow full-color, wide-bandwidth, high efficiency, chromatic and spherical aberration free operation in visible region. The light field and the depth information of objects can be determined by reorganizing the patches of light field image and calculating the disparity of neighbor meta-lenses, respectively. Moving object light field images are captured and calculated to exhibit the high efficiency sensing capability of our meta-lens array. All-in-focus images can be effectively achieved in our AMLA system. Standard resolution test chart under white light illumination displays the diffraction limited spatial resolution of 1.95 µm. The AMLA have the potential applications, such as micro robotic vision, non-men vehicle sensing, virtual and augmented reality (VR and AR), drone, and miniature personal security system etc.

REFERENCES

1. D. Keum, H. Jung, K. H. Jeong, Planar Emulation of Natural Compound Eyes. *Small* 8, 2169-2173 (2012).
2. Y. M. Song et al., Digital cameras with designs inspired by the arthropod eye. *Nature* 497, 95-99 (2013).
3. A. Lumsdaine, T. Georgiev, Full resolution lightfield rendering. *Indiana University and Adobe Systems, Tech. Rep* 91, 92 (2008).
4. E. H. Adelson, J. Y. A. Wang, SINGLE LENS STEREO WITH A PLENOPTIC CAMERA. *Ieee Transactions on Pattern Analysis and Machine Intelligence* 14, 99-106 (1992).
5. T. Georgiev, A. Lumsdaine, Focused plenoptic camera and rendering. *Journal of Electronic Imaging* 19, 021106 (2010).
6. M. Levoy, R. Ng, A. Adams, M. Footer, M. Horowitz, Light field microscopy. *Acm Transactions on Graphics* 25, 924-934 (2006).
7. R. Ng et al., Light field photography with a hand-held plenoptic camera. *Computer Science Technical Report CSTR* 2, 1-11 (2005).
8. B. Wilburn et al., High performance imaging using large camera arrays. *Acm Transactions on Graphics* 24, 765-776 (2005).
9. T. Georgiev, A. Lumsdaine, Reducing Plenoptic Camera Artifacts. *Computer Graphics Forum* 29, 1955-1968 (2010).
10. N. Zeller, F. Quint, U. Stilla, Depth estimation and camera calibration of a focused plenoptic camera for visual odometry. *Isprs Journal of Photogrammetry and Remote Sensing* 118, 83-100 (2016).
11. D. Arslan et al., Angle-selective all-dielectric Huygens' metasurfaces. *J. Phys. D-Appl. Phys.* 50, 8 (2017).
12. C. C. Chen et al., Uniaxial-isotropic Metamaterials by Three-Dimensional Split-Ring Resonators. *Advanced Optical Materials* 3, 44-48 (2015).
13. Y. W. Huang et al., Gate-Tunable Conducting Oxide Metasurfaces. *Nano Letters* 16, 5319-5325 (2016).
14. S. Jahani, Z. Jacob, All-dielectric metamaterials. *Nature Nanotechnology* 11, 23-36 (2016).
15. P. V. Kapitanova et al., Photonic spin Hall effect in hyperbolic metamaterials for polarization-controlled routing of subwavelength modes. *Nature communications* 5, 3226 (2014).
16. H. N. Krishnamoorthy, Z. Jacob, E. Narimanov, I. Kretzschmar, V. M. Menon, Topological transitions in metamaterials. *Science* 336, 205-209 (2012).
17. R. Mudachathi, T. Tanaka, Up Scalable Full Colour Plasmonic Pixels with Controllable Hue, Brightness and Saturation. *Scientific Reports* 7, 1199 (2017).
18. X. J. Ni, Z. J. Wong, M. Mrejen, Y. Wang, X. Zhang, An ultrathin invisibility skin cloak for visible light. *Science* 349, 1310-1314 (2015).
19. L. H. Nicholls et al., Ultrafast synthesis and switching of light polarization in nonlinear anisotropic metamaterials. *Nature Photonics* 11, 628-633 (2017).
20. P. Nordlander, Plasmonics—Subwavelength imaging in colour. *Nature Photonics* 2, 387-388 (2008).
21. J. Rho et al., Spherical hyperlens for two-dimensional sub-diffractional imaging at visible frequencies. *Nature communications* 1, 143 (2010).
22. M. C. Sherrott et al., Experimental Demonstration of >230 degrees Phase Modulation in Gate-Tunable Graphene-Gold Reconfigurable Mid-Infrared Metasurfaces. *Nano Letters* 17, 3027-3034 (2017).
23. K. Thyagarajan, R. Sokhoyan, L. Zornberg, H. A. Atwater, Millivolt Modulation of Plasmonic Metasurface Optical Response via Ionic Conductance. *Advanced Materials* 29, 17011044 (2017).
24. L. Wang et al., Grayscale transparent metasurface holograms. *Optica* 3, 1504-1505 (2016).
25. A. Davoyan, H. Atwater, Quantum nonlinear light emission in metamaterials: broadband Purcell enhancement of parametric downconversion. *Optica* 5, 608-611 (2018).
26. G. Della Valle et al., Nonlinear anisotropic dielectric metasurfaces for ultrafast nanophotonics. *ACS Photonics* 4, 2129-2136 (2017).
27. W. Dickson et al., Hyperbolic polaritonic crystals based on nanostructured nanorod metamaterials. *Advanced Materials* 27, 5974-5980 (2015).
28. P. N. Dyachenko et al., Controlling thermal emission with refractory epsilon-near-zero metamaterials via topological transitions. *Nature communications* 7, 11809 (2016).
29. N. J. Halas, S. Lal, W.-S. Chang, S. Link, P. Nordlander, Plasmons in strongly coupled metallic nanostructures. *Chem. Rev.* 111, 3913-3961 (2011).
30. F. Hao et al., Symmetry breaking in plasmonic nanocavities: subradiant LSPR sensing and a tunable Fano resonance. *Nano letters* 8, 3983-3988 (2008).
31. J. Hu, C.-H. Liu, X. Ren, L. J. Lauhon, T. W. Odom, Plasmonic lattice lenses for multiwavelength achromatic focusing. *ACS nano* 10, 10275-10282 (2016).
32. J. Huang et al., Nanoscale Artificial Plasmonic Lattice in Self-Assembled Vertically Aligned Nitride-Metal Hybrid Metamaterials. *Advanced Science*, 1800416 (2018).
33. A. Ishikawa, T. Tanaka, Plasmon hybridization in graphene metamaterials. *Applied Physics Letters* 102, 253110 (2013).
34. S. Jahani et al., Controlling evanescent waves using silicon photonic all-dielectric metamaterials for dense integration. *Nature communications* 9, 1893 (2018).
35. A. I. Kuznetsov, A. E. Miroshnichenko, M. L. Brongersma, Y. S. Kivshar, B. Luk'yanchuk, Optically resonant dielectric nanostructures. *Science* 354, aag2472 (2016).
36. J. B. Lassiter et al., Designing and deconstructing the Fano lineshape in plasmonic nanoclusters. *Nano letters* 12, 1058-1062 (2012).
37. Y.-J. Lu et al., Dynamically controlled Purcell enhancement of visible spontaneous emission in a gated plasmonic heterostructure. *Nature Communications* 8, 1631 (2017).
38. G. Marino et al., Second-H armonic Generation from Hyperbolic Plasmonic Nanorod Metamaterial Slab. *Laser & Photonics Reviews* 12, 1700189 (2018).
39. Y. Moritake, T. Tanaka, Controlling bi-anisotropy in infrared metamaterials using three-dimensional split-ring-resonators for purely magnetic resonance. *Scientific reports* 7, 6726 (2017).

40. Y. Moritake, T. Tanaka, Bi-anisotropic Fano resonance in three-dimensional metamaterials. *Scientific reports* 8, 9012 (2018).
41. X. Ni, Z. J. Wong, M. Mrejen, Y. Wang, X. Zhang, An ultrathin invisibility skin cloak for visible light. *Science* 349, 1310-1314 (2015).
42. T. W. Odom, Colours at the nanoscale: Printable stained glass. *Nature nanotechnology* 7, 550 (2012).
43. G. T. Papadakis, H. A. Atwater, Field-effect induced tunability in hyperbolic metamaterials. *Phys. Rev. B* 92, 184101 (2015).
44. G. T. Papadakis, D. Fleischman, A. Davoyan, P. Yeh, H. A. Atwater, Optical magnetism in planar metamaterial heterostructures. *Nature communications* 9, 296 (2018).
45. G. T. Papadakis, P. Yeh, H. A. Atwater, Retrieval of material parameters for uniaxial metamaterials. *Phys. Rev. B* 91, 155406 (2015).
46. I. M. Pryce, K. Aydin, Y. A. Kelaita, R. M. Briggs, H. A. Atwater, Highly strained compliant optical metamaterials with large frequency tunability. *Nano letters* 10, 4222-4227 (2010).
47. G. Sartorello et al., Ultrafast optical modulation of second- and third-harmonic generation from cut-disk-based metasurfaces. *ACS photonics* 3, 1517-1522 (2016).
48. A. Sobhani et al., Pronounced linewidth narrowing of an aluminum nanoparticle plasmon resonance by interaction with an aluminum metallic film. *Nano letters* 15, 6946-6951 (2015).
49. H. Suchowski et al., Phase mismatch—free nonlinear propagation in optical zero-index materials. *Science* 342, 1223-1226 (2013).
50. B. M. Wells, A. V. Zayats, V. A. Podolskiy, Nonlocal optics of plasmonic nanowire metamaterials. *Phys. Rev. B* 89, 035111 (2014).
51. Y. Yang et al., Multimode directionality in all-dielectric metasurfaces. *Phys. Rev. B* 95, 165426 (2017).
52. J. Yao et al., Optical negative refraction in bulk metamaterials of nanowires. *Science* 321, 930-930 (2008).
53. X. Yin, Z. Ye, J. Rho, Y. Wang, X. Zhang, Photonic spin Hall effect at metasurfaces. *Science* 339, 1405-1407 (2013).
54. X. Zhang, Metamaterials for perpetual cooling at large scales. *Science* 355, 1023-1024 (2017).
55. W. Zhou et al., Lasing action in strongly coupled plasmonic nanocavity arrays. *Nature nanotechnology* 8, 506 (2013).
56. H. C. Wang et al., Ultrathin Planar Cavity Metasurfaces. *Small* 14, 1703920 (2018).
57. B. H. Chen et al., GaN Metalens for Pixel-Level Full-Color Routing at Visible Light. *Nano Letters* 17, 6345-6352 (2017).
58. H. H. Hsiao et al., Integrated Resonant Unit of Metasurfaces for Broadband Efficiency and Phase Manipulation. *Advanced Optical Materials*, 1800031 (2018).
59. S. M. Wang et al., A broadband achromatic metalens in the visible. *Nature Nanotechnology* 13, 227-232 (2018).
60. S. M. Wang et al., Broadband achromatic optical metasurface devices. *Nature Communications* 8, 187 (2017).
61. E. Goldys et al., Analysis of the red optical emission in cubic GaN grown by molecular-beam epitaxy. *Phys. Rev. B* 60, 5464 (1999).

Supplementary Information
Materials and Methods:
Design and Simulation

All numerical simulations are carried out using microwave studio commercial software based on finite integration method from the Computer Simulation Technology (CST). For the structural optimization of GaN nanostructures, the unit cell boundary condition is utilized for evaluating their transmission spectra and phase shifts. The perfect matched layer and periodic boundary condition are respectively employed for x- and y-directions for estimating the focal length of designed metalens. The refractive index of GaN is obtained from (1).

Fabrication

The fabrication processes of the metalens arrays are described as follows. A double-side polished sapphire substrate oriented along a c-axis [0001] direction is first prepared for the processes. An 800-nm-thick un-doped GaN epitaxial layer is subsequently grown on the sapphire substrate by metal-organic chemical vapor deposition (MOCVD). During the growth process, high purity hydrogen ($H_2$) is used as the carrier gas to transport trimethylgallium (TMGa) and ammonia ($NH_3$) employed as gallium and nitrogen precursors, respectively.

After the growth of un-doped GaN on the sapphire substrate, a 400-nm silicon dioxide ($SiO_2$) layer, as a hard mask layer, is deposited by using plasma-enhanced chemical vapor deposition (PECVD). A diluted ZEP-520A (ZEP-520A ZEPA=1:3) working as a positive tone electron-beam resist is then spin-coated on the prepared substrate (5000 rpm, 90 seconds) and baked on a hot plate (3 minutes, 180° C.) to form a 150-nm resist layer. The achromatic metalens arrays are defined by the exposure of an Elionix ELS-7000 electron-beam lithography system at a 100-kV acceleration voltage with a beam current of 100 pA. The structure profile of the metalens arrays in the exposed substrate are revealed after the development process in ZED-N50 for 5 minutes, followed by rinsing with IPA for 10 seconds and drying under a dry $N_2$ stream. Next, a 40-nm Cr layer as a hard etching mask layer is coated by electron-gun evaporator. After the lift-off process in a solution of N,N-Dimethylacetamide (ZDMAC), the patterns are transferred to the 400-nm-thick $SiO_2$ hard mask layer by reactive ion etching (RIE) operated at the plasma power of 90 W. Afterwards, the inductively-coupled-plasma reactive ion etching (ICP-RIE) system with $BCl_3/Cl_2$ chemistry is utilized to etch the sample with the patterned $SiO_2$ hard mask layer. The ICP-RIE system is operated at a RF frequency of 13.56 MHZ with an ICP source power of 700 W and a bias power of 280 W. Finally, the sample can be obtained after removing the patterned $SiO_2$ hard mask by immersing in a buffered oxide etch (BOE) solution.

Rendering for the Images with Different Focusing Depths

Figure 14:
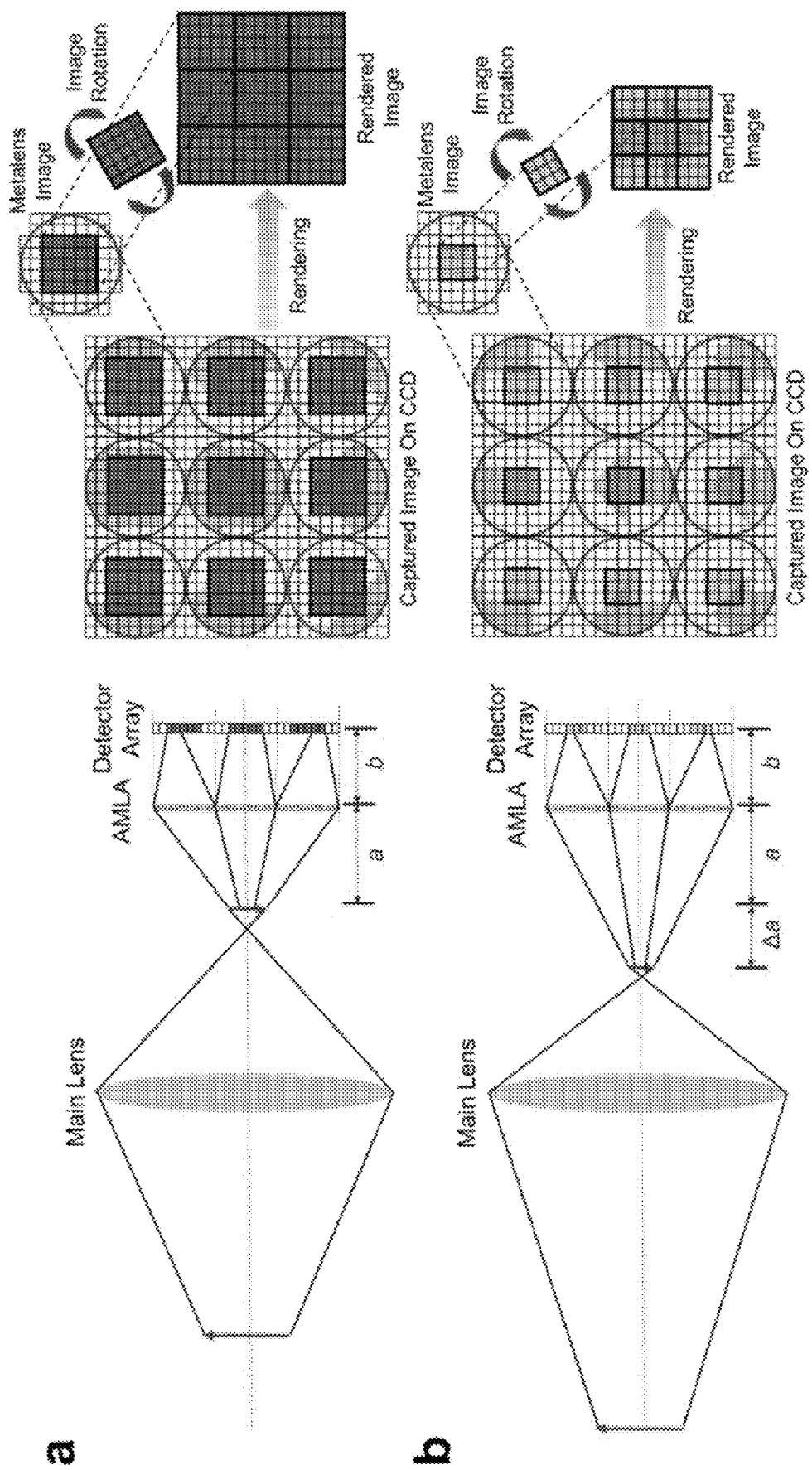
FIG. 14: The rendering algorithm of focused light field imaging with different patch size for different focusing depth. a, Near object, b, Far object.

The graphical depiction of rendering algorithm of focused light field imaging is shown in FIG. 14. Each metalens captures different perspectives of scene, containing the positional and angular information of radiance. Therefore, the specific viewpoint of scene can be reproduced by grouping some specific pixels of per sub-images. We adopt square patches in the center of per sub-images to integrate an image with a specific focusing depth. Integration of different sizes of patches indicates different focusing depth (2, 3). From farthest to closest focusing depths, the number of pixels of patches is used from 47×47 to 5×5, depending on the ratio of a to b.

Depth Estimation

Figure 15:
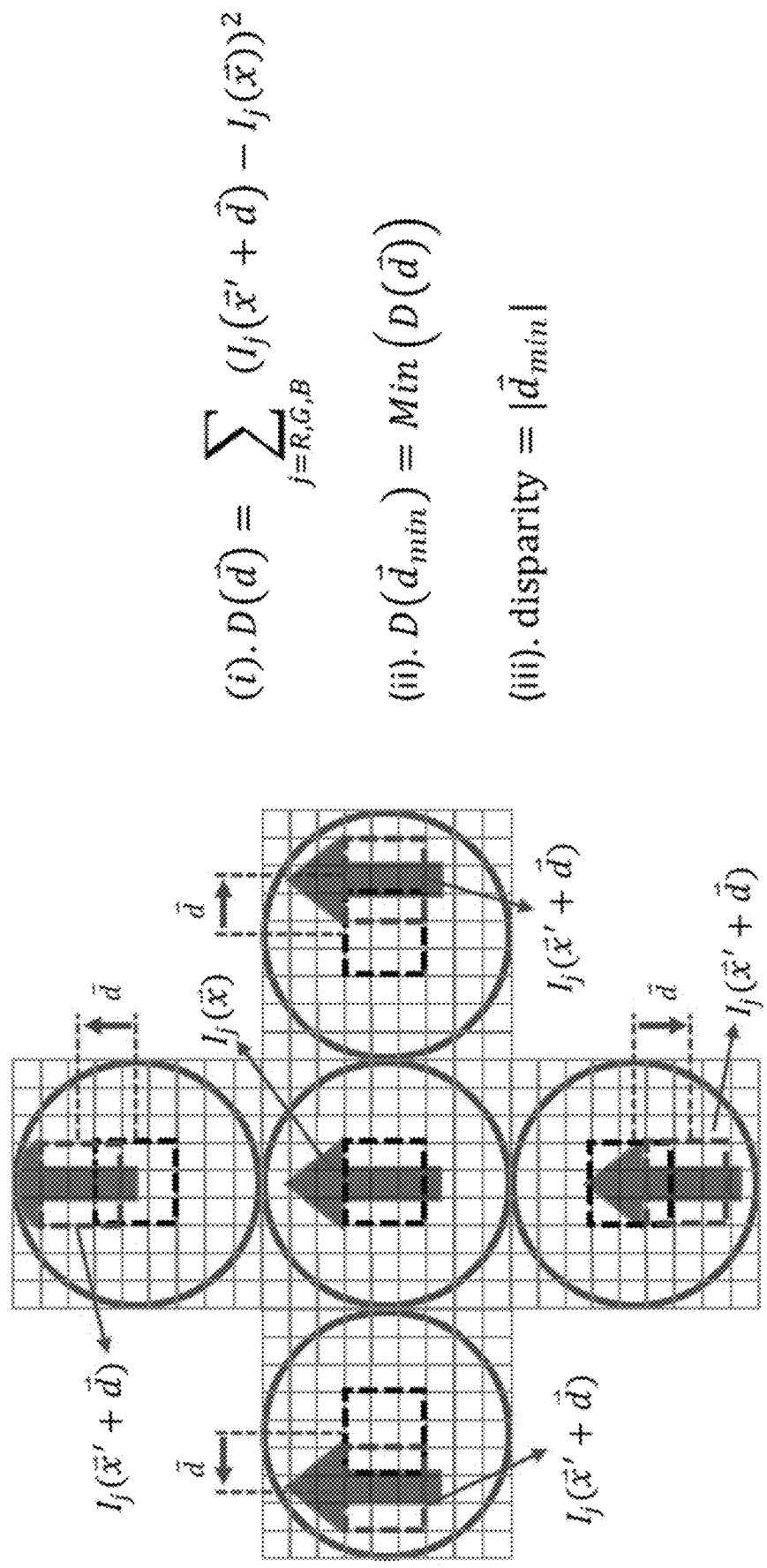
FIG. 15: Depth estimation algorithm. The depth information is obtained from the disparities (or cross correlations) between neighbouring sub-images.

The graphical depiction of depth estimation algorithm is shown in FIG. 15. First, we have to decide a square patch in center sub-image of which suitable size is around a quarter of metalens diameter. Second, we compare the radiance between the patch of center sub-image and those of adjacent sub-images but with shifts $\vec{d}$ (pixels). Their radiance difference D($\vec{d}$) is defined as the sum of the difference from RGB color values in Equation (i). Finally, we find out the minimum d value as the disparity between two metalenses by Equation (ii) and (iii). The disparities mean the depth information which can be transformed into the actual distance (3, 4).

SUPPLEMENTARY TABLE 1

Feature sizes of GaN nanostructures.

Inverse GaN structures

| $L_B$(nm) | $W_B$(nm) | Phase Compensation(°) |
|---|---|---|
| 125 | 50 | 1080 |
| 140 | 60 | 1110 |
| 163 | 80 | 1080 |

Solid GaN nanopillars

| $L_P$(nm) | $W_P$(nm) | Phase Compensation(°) |
|---|---|---|
| 165 | 110 | 1050 |
| 165 | 100 | 1020 |
| 155 | 95 | 990 |
| 150 | 90 | 960 |
| 145 | 85 | 930 |
| 140 | 80 | 900 |
| 140 | 75 | 870 |
| 135 | 70 | 840 |
| 135 | 65 | 810 |
| 130 | 60 | 780 |
| 125 | 55 | 750 |
| 115 | 50 | 720 |
| 95 | 50 | 690 |
| 80 | 45 | 660 |

REFERENCES OF SUPPLEMENTARY INFORMATION

1. A. Barker Jr, M. Ilegems, Infrared lattice vibrations and free-electron dispersion in GaN. *Phys. Rev. B* 7, 743 (1973).
2. A. Lumsdaine, T. Georgiev, Full resolution lightfield rendering. *Indiana University and Adobe Systems, Tech. Rep* 91, 92 (2008).
3. T. Georgiev, A. Lumsdaine, Reducing Plenoptic Camera Artifacts. *Computer Graphics Forum* 29, 1955-1968 (2010).
4. N. Zeller, F. Quint, U. Stilla, Depth estimation and camera calibration of a focused plenoptic camera for visual odometry. *Isprs Journal of Photogrammetry and Remote Sensing* 118, 83-100 (2016).

What is claimed is:

1. A light field imaging device, comprising:
a main lens;
a metalens array which is disposed in alignment with the main lens, wherein the metalens array comprises a plurality of metalenses, and each metalens comprises a plurality of nanostructures and a dielectric layer, the nanostructures are disposed on the dielectric layer, and the nanostructures comprises:
an array of first phase compensation structures, and
an array of second phase compensation structures, wherein the array of the first phase compensation structures are disposed to surround the array of the second phase compensation structures so as to define a single metalens, the first and second phase compensation structures are complementary to each other and substantially satisfy the Babinet's principle; and
an imaging sensing unit which is disposed on an opposite side of the metalens array with respect to the main lens, and is configured to receive an imaging signal generated from the metalens array.

2. The light field imaging device according to claim 1, wherein each first phase compensation structure is a nanopillar, each second phase compensation structure is a nanopore.

3. The light field imaging device according to claim 1, wherein each metalens has a phase profile which satisfy the following equations (A) to (D), $$\varphi_{AL}(r, \lambda) = -\left[\frac{2\pi}{\lambda}\left(\sqrt{r^2 + f^2} - f\right)\right] + \varphi_{shift}(\lambda) \quad (A)$$

$$\varphi_{shift}(\lambda) = \frac{a}{\lambda} + b \quad (B)$$

$$a = \delta\frac{\lambda_{min}\lambda_{max}}{\lambda_{max} - \lambda_{min}} \quad (C)$$

$$b = -\delta\frac{\lambda_{min}}{\lambda_{max} - \lambda_{min}} \quad (D)$$

where $\varphi_{AL}$ is a phase retardation of an arbitrary point on a surface of the metalens, r is a distance between said arbitrary point and a center on said surface of the metalens, $\lambda$ is a working wavelength in free space, f is a designed focal length, $\lambda_{min}$ and $\lambda_{max}$ are the boundaries of an interest wavelength band, and $\delta$ is a largest additional phase shift between $\lambda_{min}$ and $\lambda_{max}$ at the center of the metalens.

4. The light field imaging device according to claim 1, wherein each first phase compensation structure and each second phase compensation structure are made of a transparent material which is selected from the group consisting of gallium nitride (GaN), gallium phosphide (GaP), aluminum arsenide (AlAs), aluminum gallium arsenide (AlGaAs), titanium dioxide ($TiO_2$), silicon (Si), and silicon nitride ($Si_3N_4$).

5. The light field imaging device according to claim 1, wherein the first and second phase compensation structures are in a periodic hexagonal lattice.

6. The light field imaging device according to claim 1, wherein the dielectric layer is made of a material which is selected from the group consisting of ITO, Al:ZnO (AZO), Ga:ZnO(GZO), $SiO_2$ and $Al_2O_3$.

7. The light field imaging device according to claim 1, wherein each metalens is transparent.

8. The light field imaging device according to claim 1, wherein each first phase compensation structure is a nanopore, and each second phase compensation structure is a nanopillar.

9. The light field imaging device according to claim 1, wherein in at least one of the metalenses the first phase compensation structures are nanopillars and the second phase compensation structures are nanopores, and in at least another one of the metalenses the first phase compensation structures are nanopores and the second phase compensation structures are nanopillars.

10. The light field imaging device according to claim 1, wherein focal lengths of all metalenses are the same.

11. The light field imaging device according to claim 1, wherein at least one of the metalenses has a focal length which is different from that of another metalens.

12. The light field imaging device according to claim 1, wherein the array of the first phase compensation structures surrounds the array of the second phase compensation structures concentrically.

13. The light field imaging device according to claim 1, wherein the imaging signal comprises a plurality of sub-images, and each sub-image is generated from each single metalens.

14. A light field imaging method, comprising the following steps:
receiving an optical signal of an object by a metalens array from a main lens, wherein the metalens array comprises a plurality of metalenses, and each metalens comprises a plurality of nanostructures and a dielectric layer, wherein the nanostructures are disposed on the dielectric layer, and the nanostructures comprises an array of first phase compensation structures and an array of second phase compensation structures, wherein the array of the first phase compensation structures are disposed to surround the array of the second phase compensation structures so as to define a single metalens, the first and second phase compensation structures are complementary to each other and substantially satisfy the Babinet's principle;
obtaining an imaging signal generated from the metalens array by an imaging sensing unit, wherein the imaging signal comprises a plurality of sub-images of the object; and rendering the imaging signal which comprises the sub-images based on a specific focal depth so as to obtain an image of the object at the specific focal depth.

15. The light field imaging method according to claim 14, wherein each sub-image is generated from each single metalens.

16. The light field imaging method according to claim 14, wherein during rendering the imaging signal, a square patch of each sub-image is adopted so as to integrate the image of the object at the specific focal depth, wherein each square patch is positioned at the center of each sub-image.

17. The light field imaging method according to claim 16, wherein sizes of the square patches are varied with the specific focal depth.

18. An image depth estimation method, comprising the following steps:
obtaining an imaging signal which comprises a plurality of sub-images of an object and is generated from a metalens array by an imaging sensing unit, wherein the metalens array comprises a plurality of metalenses, and each metalens comprises a plurality of nanostructures and a dielectric layer, wherein the nanostructures are disposed on the dielectric layer, and the nanostructures comprises an array of first phase compensation structures and an array of second phase compensation structures, wherein the array of the first phase compensation structures are disposed to surround the array of the second phase compensation structures so as to define a single metalens, the first and second phase compensation structures are complementary to each other and substantially satisfy the Babinet's principle;
selecting one of the sub-image;
deciding a square patch in the selected sub-image, wherein the square patch has a size around a quarter of a diameter of the metalens which generates the selected sub-image;
calculating radiance differences between the selected sub-image and an adjacent sub-image of the selected sub-image so as to obtain a disparity between the selected sub-image and the adjacent sub-image; and
calculating the obtained disparities to obtain a depth information of the imaging signal.

19. The image depth estimation method according to claim 18, wherein each disparity between any two adjacent sub-images is calculated from a sum of the radiance differences of red, green, and blue light between said two adjacent sub-images.

* * * * *